United States Patent [19]
Matsuoka et al.

[11] Patent Number: 5,645,028
[45] Date of Patent: Jul. 8, 1997

[54] PISTON STRUCTURE WITH A COMBUSTION CHAMBER

[75] Inventors: Hiroshi Matsuoka, Yamato; Hideo Kawamura, Samukawa-machi, both of Japan

[73] Assignee: Isuzu Motors Limited, Tokyo, Japan

[21] Appl. No.: 561,002

[22] Filed: Nov. 21, 1995

[51] Int. Cl.$^6$ ........................................... F02B 19/08
[52] U.S. Cl. .............................. 123/276; 123/279
[58] Field of Search ................................. 123/276, 279, 123/293, 273, 193.6

[56] References Cited

U.S. PATENT DOCUMENTS

| | | | |
|---|---|---|---|
| 3,132,633 | 5/1964 | Zimmerman | 123/276 |
| 4,018,194 | 4/1977 | Mitchell et al. | 123/276 |
| 4,898,135 | 2/1990 | Failla et al. | 123/279 |
| 5,121,722 | 6/1992 | Horiuchi | 123/276 |
| 5,322,042 | 6/1994 | Di Priolo et al. | 123/279 |
| 5,483,933 | 1/1996 | Kawamura | 123/276 |
| 5,515,823 | 5/1996 | Kawamura | 123/276 |

FOREIGN PATENT DOCUMENTS

| | | |
|---|---|---|
| 0 675 273 | 10/1995 | European Pat. Off. . |
| 2 559 837 | 8/1985 | France . |
| 60-100528 | 7/1985 | Japan . |
| 60-141446 | 9/1985 | Japan . |
| 63-109267 | 5/1988 | Japan . |
| 63-93141 | 6/1988 | Japan . |
| 2-112613 | 4/1990 | Japan . |
| 2-149725 | 6/1990 | Japan . |
| 6-241049 | 8/1994 | Japan . |
| 265 412 | 2/1927 | United Kingdom . |

OTHER PUBLICATIONS

Patent Abstracts of Japan, vol. 12, No. 134 (23 Apr. 1988), JP-A-62 255560.

*Primary Examiner*—Marguerite McMahon
*Attorney, Agent, or Firm*—Browdy and Neimark

[57] ABSTRACT

The combustion chamber structure having a combustion chamber almost at the center of the piston is installed in a cavity formed in the piston body with a heat insulating layer interposed therebetween. The combustion chamber structure and the piston body are joined by a joining member. The combustion chamber structure is formed with a nozzle insertion hole and communication holes. The joining member is made of a material with a thermal expansion coefficient intermediate between those of the piston body and the combustion chamber structure, or of almost the same kind of material as the piston body. Alternatively, the combustion chamber structure forms a piston head portion and the piston body forms a piston skirt portion. The lower surface of the piston head portion is formed as a tapered surface that is inclined toward the periphery. The upper surface of the piston skirt portion is also formed as a tapered surface that extends along the opposing tapered surface of the piston head portion. The lower surface of the outer periphery of the piston head portion and the upper surface of the outer periphery of the piston skirt portion are in firm contact with each other. The combustion chamber structure of this invention is so constructed that a rich air-fuel mixture is generated in the upper part of the combustion chamber and that the mixture is quickly ejected into the cylinder chamber to reduce the combustion period.

8 Claims, 15 Drawing Sheets

PISTON STRUCTURE WITH A COMBUSTION CHAMBER

FIELD OF THE INVENTION

The present invention relates to a piston structure having a combustion chamber structure in which a combustion chamber is formed almost at the center of the piston shaft.

BACKGROUND OF THE INVENTION

The combustion temperature in a precombustion chamber is generally high and it is therefore effective in reducing NOx emissions to burn rich air-fuel mixture. Burning the rich mixture when the combustion temperature is high is effectively realized by the use of engines with a precombustion chamber. In the precombustion chamber-incorporated engines, to increase the combustion speed of the precombustion chamber almost to that of the direct injection type combustion chamber requires increasing the cross-sectional passage area of a communication hole connecting the precombustion chamber to the main combustion chamber. Increasing the cross-sectional area of the communication hole, however, lowers the ejection speed of the mixture flowing from the precombustion chamber into the main combustion chamber, resulting in a poor combustion in the main combustion chamber. Because the communication hole that connects the main combustion chamber and the precombustion chamber is located either at the central part of the cylinder or at one point of the cylinder periphery, the distance that the fuel mixture jet must travel is long, with the result that the fuel mixture and air in the main combustion chamber are not sufficiently mixed, producing HC emissions and smoke.

There has been an engine with a swirl chamber, developed to improve combustion. The engine with a swirl chamber includes a swirl chamber formed in the cylinder head or piston head, a communication hole communicating the swirl chamber to the main combustion chamber formed in the cylinder, and a fuel injection nozzle that sprays fuel into the swirl chamber. In this structure a swirl produced in the swirl chamber is mixed with a fuel injected into the chamber to form air-fuel mixture, which is subjected to a primary combustion. The flame and unburned mixture gas is elected from the swirl chamber through the communication hole into the main combustion chamber where the mixture is subjected to second combustion (Japan Patent Laid-Open No. 112613/1990).

The engine with a swirl chamber has a problem that unless the direction of swirl formed in the swirl chamber, the direction of sprayed fuel from the fuel injection nozzle and the fuel injection timing from the fuel injection nozzle match, the amount of emissions such as NOx and smoke will increase. Because in the swirl chamber-incorporated engine the communication hole connecting the precombustion chamber and the main combustion chamber is small, there is a throttling loss caused by the communication hole which reduces the engine output. The communication hole connecting the main combustion chamber and the precombustion chamber is generally located at the central part or outer peripheral part of the cylinder, so that the distance that the jet of mixture must travel is long, resulting in poor mixing of the fuel mixture with air in the main combustion chamber. This in turn produces emissions such as HC and smoke, and also reduces combustion speed and mileage.

Where the engine is constructed to have a precombustion chamber, increasing the combustion speed of the precombustion chamber almost to that of the direct injection type combustion chamber requires enlarging the cross sectional area of the communication hole, which connects the precombustion chamber and the main combustion chamber. When the cross-sectional area of the communication hole is increased, however, the speed of ejection from the precombustion chamber to the main combustion chamber is reduced, resulting in an insufficient combustion in the main combustion chamber.

To deal with this problem, a possible measure may involve installing the precombustion chamber at the center of the cylinder and providing two or more communication holes to connect the main combustion chamber and the precombustion chamber, both on the cylinder side. This increases the overall cross-sectional area of the communication holes and therefore lowers the throttling loss caused by the communication holes without reducing the energy of ejection from the precombustion chamber through the communication holes into the main combustion chamber.

Forming the precombustion chamber almost at the center of the cylinder head, however, raises a problem of reducing the space where the intake and exhaust ports are formed. This may be solved by forming the precombustion chamber in the piston in the precombustion chamber-incorporated engine. Considering the thermal energy dissipation from the precombustion chamber formed in the piston, the precombustion chamber may be constructed in a heat insulating structure.

In the engine with a precombustion chamber, the air flow in the precombustion chamber is active and the heat transfer rate between the hot burning gas and the inner wall of the precombustion chamber is high. Because flame and unburned fuel mixture gas is ejected at high speed from the precombustion chamber through the communication holes into the main combustion chamber, the heat transfer rate between the wall surface of the communication holes and hot burning gas passing through them is high.

There has been developed a heat insulating engine, which reduces heat dissipation from the combustion chamber to improve thermal efficiency. The heat insulating piston has its piston head formed in a heat insulating structure—which includes a reduced area of contact through a low thermal conduction Material, and an air layer—thereby keeping the temperature of the wall surface of the piston head high and that of the piston skirt low for sliding. The heat-resistant members forming the piston head are made of a low thermal expansion ceramics such as $Si_3N_4$. Likewise, the material of the piston skirt uses a low thermal expansion metal such as low thermal expansion cast iron.

The heat insulating piston has a piston skirt mounted to the piston head. Although the metal of the piston skirt has a low thermal coefficient, the thermal expansion at high temperature is large when compared with that of the ceramics such as $Si_3N_4$ that forms the piston head. Therefore, not only is the mounting structure between the piston head and the piston skirt is complicated but, when a heat insulating air layer is formed between the piston head and the piston skirt, the gas seal structure for high temperature and high pressure gas at the outer circumference of the piston becomes complex, increasing the manufacture cost. When the heat insulation air layer is not formed between the piston head and the piston skirt, the insulation level deteriorates, increasing the heat flow from the piston head to the piston skirt. This in turn increases heat dissipation from the combustion chamber, resulting in a degraded performance of the engine.

The ceramic piston disclosed in Japan Utility Model Laid-Open No. 93141/1987 is characterized in that the outer periphery of a ceramic crown with a cavity is fitted in the head portion of a cylindrical aluminum skirt, that the a plastic fluid material is installed in a gap between the outer periphery of the ceramic crown and the head portion, that the plastic fluid material is heated and pressurized to be deformed, joining the ceramic crown and the aluminum skit together, and that a cast iron ring is installed, together with the plastic fluid material, in the gap between the combustion chamber outer periphery and the head portion.

The engine with a precombustion chamber disclosed in Japan Patent Laid-Open No. 241049/1994 has a precombustion chamber formed in the piston head, a main combustion chamber formed in the cylinder, communication holes connecting the main combustion chamber and the precombustion chamber, and a fuel injection nozzle that injects fuel into the precombustion chamber. As the piston nears the top dead center, the fuel injection nozzle protrudes into the nozzle insertion hole formed in the piston head. The communication holes are formed inclined with respect to the cylinder axis in the circumferential direction so that the direction of inflow into the precombustion chamber is reverse to the direction of swirl in the main combustion chamber and that the direction of ejection from the precombustion chamber to the main combustion chamber is in the same direction as the swirl in the main combustion chamber.

Japan Patent Laid-Open No. 149725/1990 discloses a direct injection type alcohol engine. In this alcohol engine, an injector injects alcohol fuel into a combustion chamber comprising a recessed portion formed in the top of the piston. The top clearance when the piston is at the top dead center is set to 2-5 mm. The combustion chamber is formed with a lip at the opening edge, and the circumferential wall almost perpendicular to the direction in which the fuel is sprayed from the injector is formed along the circumferential direction in the combustion chamber.

Japan Utility Model Laid-Open No. 100528/1985 discloses a piston for direct injection type diesel engines. This piston is characterized in that the opening portion of the combustion chamber formed in the piston top portion is provided with a closing member, that fuel injection passages communicating the combustion chamber and the cylinder chamber are formed in the closing member in such a way that they are oriented in the direction that produces a swirl in the combustion chamber and extend almost parallel to the direction in which the fuel is ejected from the fuel injection nozzle. This piston uses a heat-resistant material in the top portion of the combustion chamber subjected to severe thermal load to secure a sufficient durability, but it does not employ a heat insulating structure for the precombustion chamber.

Japan Utility Model Laid-Open No. 141446/1985 discloses a ceramics-incorporated piston. The ceramics-incorporated piston has an assembly which consists of a ceramic member and a heat- and corrosion-resistant metal ring joined to the outer periphery of the ceramic member. The assembly is threaded into the piston body of aluminum alloy to install the ceramic member in the recess of the piston body on the combustion chamber side. The combustion chamber is therefore formed of a ceramic member, which is threaded into the piston body of aluminum alloy.

Japan Patent Laid-Open No. 109267/1988 discloses a piston for internal combustion engines. This piston has a piston body and a ceramic cavity member installed in the top part of the piston body by casting. That is, the piston body is cast around the cavity member, with a heat insulating layer—which is a molded ceramic fiber attached with an inorganic material—covering the outer surface of the cavity member. The heat insulating layer of ceramic fiber is provided around the combustion chamber to prevent ingress of molten metal of the piston body into the combustion chamber and to secure the strength of the combustion chamber. The piston, however, does not provide a structure for joining the heat-resistant metal and the heat insulating layer.

In the piston with a combustion chamber, it is preferred that, when a combustion chamber structure that forms the combustion chamber is installed in the cavity formed in the piston body, the combustion chamber structure be made of a heat-resistant, high temperature high strength material if the piston body is made of aluminum alloy or cast iron. In that case, one problem that should be addressed is that the combustion chamber structure should be firmly secured to the piston body while minimizing the dissipation of heat energy from the combustion chamber formed in the combustion chamber structure.

SUMMARY OF THE INVENTION

An object of this invention is to solve the above-mentioned problems, that is, to provide a piston structure with a combustion chamber, in which a combustion chamber is formed in the piston to simplify the cylinder head structure and allow the intake and exhaust ports to be formed large or make it possible to form two or more sets of these ports; in which the piston body is formed with a cavity where a combustion chamber structure having a combustion chamber therein is installed with a heat insulating air layer interposed therebetween; in which the combustion chamber structure is made of almost the same kind of material as the piston body to absorb a thermal expansion difference so that it can be firmly installed without play in the piston body; and in which the heat dissipation from the combustion chamber to the piston body is minimized and the combustion chamber structure is made easy to assemble and is formed in a low heat capacity structure.

Another object of this invention is to provide a piston structure with a combustion chamber, which has the following features: the combustion chamber structure having a combustion chamber therein or the piston top portion of the structure is made of heat-resistant alloy; the combustion chamber structure is firmly and stably secured to the piston body of such metal as aluminum alloy by a joining member which can control thermal expansions of the combustion chamber structure and the piston body; the heat insulating performance of the combustion chamber is enhanced to prevent heat dissipation from the combustion chamber to the piston body; the combustion chamber is located at the center so as to reduce the distance that the fuel jet from the combustion chamber must travel; and the area of the communication holes is increased to reduce the throttling loss caused by the communication holes, thus promoting the mixing of fuel mixture with fresh air present in the main combustion chamber, i.e., the cylinder chamber, and shortening the combustion period to improve the performance of the engine.

A further object of this invention is to provide a piston structure with a combustion chamber, which is characterized in that the outer periphery of the piston head portion, which has a combustion chamber structure formed with a combustion chamber, is tapered; that a heat insulating layer is formed at the boundary between the piston head portion and the piston skirt portion to reduce heat conductivity between them, significantly enhancing the heat insulating performance, reducing the thermal load of the piston, and preventing heat dissipation from the combustion chamber to the outside; that there is no need to provide a perfect gas seal by installing a gasket between the piston head portion and the piston skirt portion; and that the combustion chamber structure installed in the piston head portion is made light in weight and low in heat capacity.

A further object of this invention is to provide a piston structure with a combustion chamber, which is characterized in that the combustion chamber is formed in the cavity formed in the piston head portion; that a fuel injection nozzle is provided to the cylinder head so that, when the piston nears the top dead center, it protrudes into the combustion chamber where it sprays fuel; the impinging angle between the sprayed fuel and the combustion chamber wall surface is set at an appropriate value to guide the sprayed fuel along the combustion chamber wall surface toward the communication holes—which communicate the main combustion chamber and the combustion chamber—so that rich fuel mixture is produced near the communication holes of the combustion chamber and lean mixture at the bottom of the combustion chamber; that, after the mixture is ignited in the combustion chamber, flame and unburned mixture gas is ejected quickly from the combustion chamber into the main combustion chamber, thereby shortening the burning time in the main combustion chamber and improving the heat efficiency.

The piston structure with a combustion chamber according to the first embodiment comprises a piston body made of a metal formed with a cavity; a combustion chamber structure installed in the cavity with a heat insulating air layer interposed therebetween, the combustion chamber structure forming the combustion chamber and made of a heat-resistant, high-temperature high-strength material; and a mounting ring engaging the outer circumference of the combustion chamber structure, the mounting ring having a part of its outer circumference engaged with the piston body to secure the combustion chamber structure inside the cavity, the mounting ring being made of almost the same kind of material as that of the piston body. The combustion chamber is formed almost at the center of the piston in a heat insulating structure.

Therefore, if there is a thermal expansion difference between the piston body and the combustion chamber structure, the mounting ring, as it is thermally expanded, absorbs the thermal expansion difference between the combustion chamber structure and the piston body, thereby pressing the combustion chamber structure against the cavity wall surface of the piston body to firmly fix them together without play. Because the combustion chamber is located almost at the center of the piston, the distance the mixture jet from the communication holes must travel is short, reducing the burning time and improving combustion efficiency. The fact that the travel distance of the mixture jet from the combustion chamber is short allows the passage area of the communication holes to be formed large, reducing the throttling loss and improving the efficiency.

Because a thermal expansion control member is installed between the top surface of the projecting portion provided to the lower outer circumferential part of the combustion chamber structure and the lower end surface of the mounting ring, it is possible to adjust the thermal expansion among the combustion chamber structure, the piston body and the mounting ring and thereby make the mounting structure between them very robust. Further, because the mounting ring and the thermal expansion control member combine to adjust the thermal expansion difference between the piston body and the combustion chamber structure and thereby eliminates play, firm and stable connection between them is assured. It is therefore possible to use ceramics such as $Si_3N_4$ with small thermal expansion coefficient in forming the combustion chamber structure. The combustion chamber structure can thus be made highly resistant to heat and have a robust combustion chamber.

Further, because the heat insulating air layer is formed between the piston body and the combustion chamber structure, it is possible to reduce the heat capacity of the combustion chamber structure and improve the capability to follow the gas temperature. At the same time, the heat insulating air layer greatly enhances the heat insulating performance of the combustion chamber, minimizing release of thermal energy from the combustion chamber and improving fuel efficiency.

There is installed a low heat conduction member between the thermal expansion control member and the top surface of the projecting portion of the combustion chamber structure and between the bottom surface of the projecting portion and the cavity wall surface of the piston body. Because of the low heat conduction member, the projecting portion is formed at the lower part of the combustion chamber structure whose temperature is low. This construction reduces the temperature change and thermal expansion change of the projecting portion, which in turn allows the combustion chamber structure to be stably held within the cavity of the piston body without play.

Further, a low heat conduction member is interposed between the top surface of the projecting portion provided at the lower outer circumference of the combustion chamber structure and the lower end surface of the mounting ring and between the bottom surface of the projecting portion and the cavity wall surface of the piston body. Because the projecting portion is pressed down by the mounting ring, the lower part of the combustion chamber structure has a small temperature change and also a small thermal expansion change, so that the combustion chamber structure can be secured firmly and stably to the piston body at all times.

A gap is formed between the inner circumferential surface of the mounting ring and the outer circumferential surface of the combustion chamber structure. Further, if the heat insulating air layer between the combustion chamber structure and the piston body is hermetically enclosed by a seal gasket, the heat insulation performance of the combustion chamber can be enhanced.

The piston body can easily be formed with a piston cooling passage to maintain the piston body at low temperatures while keeping the combustion chamber at high temperatures. By flowing coolant oil through the cooling passage, it is possible to keep the combustion chamber formed in the combustion chamber structure at high temperatures and the piston body at low temperatures.

Between the outer circumferential surface of the mounting ring and the cavity wall surface of the piston body is formed a cooling passage that connects to the lower part of the piston body. Above and beneath the cooling passage, the outer circumferential surface of the mounting ring and the cavity wall surface of the piston body are joined at their boundary.

The upper outer circumferential surface of the mounting ring and the cavity wall surface of the piston body are fused together, and a gap is formed between the lower outer circumferential surface of the mounting ring and the cavity wall surface of the piston body.

A sealing gasket is interposed between an undercut portion formed on the inner circumferential surface of the mounting ring and a stepped portion formed on the outer circumferential surface of the combustion chamber structure. The mounting ring forms the whole of the piston top portion, with the bottom surface of the mounting ring and the top surface of the piston body joined together.

The piston structure with a combustion chamber as the second embodiment of this invention comprises a combustion chamber structure installed in the cavity formed almost at the center of the piston head portion of the piston body made of a metal; a nozzle insertion hole formed in a piston top portion of the combustion chamber structure so that a fuel injection nozzle mounted on the cylinder head can enter through the nozzle insertion hole when the piston is near the top dead center; and communication holes formed in the piston top portion in such a way that they are arranged, spaced from each other, in the circumferential direction of the nozzle insertion hole; wherein the combustion chamber structure is made of a low thermal expansion, heat-resistant alloy, and the outer wall surface of the combustion chamber structure and the cavity wall surface of the piston body are joined by a joining member having a thermal expansion coefficient intermediate between those of the piston body and the combustion chamber structure.

In this construction, the thermal expansions of the piston body and the combustion chamber structure can be controlled by the joining member, assuring stable and firm connection between them and thereby enhancing the durability of the piston. The piston structure with a combustion chamber of this embodiment can also reduce NOx emissions by burning rich fuel mixture in the combustion chamber. The piston structure is also characterized by a heat insulating structure that reduces thermal load of the piston and prevents heat dissipation from the combustion chamber to the outside, thereby improving heat efficiency.

The piston head portion is formed at its center with the nozzle insertion hole through which the fuel injection nozzle can enter as the piston nears the top dead center. The piston head portion is also formed with two or more communication holes—connecting the main combustion chamber and the combustion chamber—around the nozzle insertion hole in such a way that they are inclined with respect to cylinder axis and arranged spaced from each other in the circumferential direction of the nozzle insertion hole. In this construction, the combustion chamber is located at the center of the piston and the distance that the fuel jet from the communication holes must travel is short. This in turn reduces the burning period promoting the mixing of the fuel mixture with fresh air present in the periphery of the cylinder, improving the performance. If the communication holes are inclined outwardly, the travel distance of the jet from the combustion chamber will be further reduced, accelerating the mixing with fresh air in the cylinder periphery.

Because the distance that the fuel jet must travel from the precombustion chamber to the main combustion chamber is short, the passage area of the communication holes as a whole can be made large to reduce the throttling loss and improve efficiency. The piston structure with a precombustion chamber, therefore, can produce and burn rich fuel mixture in the precombustion chamber and at the same time ensure the burning speed equivalent to that of the direct injection type combustion chamber. This in turn minimizes the NOx emissions, promotes mixing of fuel with air in the main combustion chamber and, because of the increased burning speed, shortens the burning period. This piston structure therefore assures combustion with reduced emissions of NOx, HC and smoke.

The heat-resistant alloy for the combustion chamber structure is preferably a material with low thermal expansion coefficient and high heat resistance, such as Incoloy 903. The piston top portion is made of Incoloy 903 or $Si_3N_4$ with low thermal expansion and excellent heat resistance, and the piston top portion and the combustion chamber structure are joined together by metal flow.

The joining member is preferably formed of a thermal expansion gradient member whose thermal expansion coefficient increases from the combustion chamber structure toward the piston body. It is also desired that the outermost circumferential portion of the joining member be made of a material with a thermal expansion coefficient close to that of the piston body. The thermal expansion gradient member may be manufactured as by concentrically stacking materials of different thermal expansion coefficients while rotating them by centrifugal casting, and then sintering the cast material.

When the piston body is made of aluminum alloy, the side of the joining member that contacts the piston body may be formed of Niresist having a thermal expansion coefficient close to that of the aluminum alloy to maintain the strong and stable joining force even when subjected to thermal load.

The piston top portion is formed with the communication holes and thus subjected to hot gas to become a high temperature area. Hence, the piston top portion is made from a heat-resistant alloy such as Incoloy 903 or a heat-resistant ceramics such as $Si_3N_4$ with low thermal expansion coefficient. The circumferential wall portion and the bottom wall portion of the combustion chamber structure are made of a heat-resistant alloy having a thermal expansion coefficient intermediate between those of the piston top portion and the piston body, and the circumferential wall portion and the piston body is joined by metal flow. Alternatively, the piston top portion may be formed separate from the circumferential wall portion, and these two members be joined together by plastic deformation of metal, i.e., metal flow, or by beam welding.

The combustion chamber structure having the circumferential wall portion and the bottom wall portion is made of a composite material, which is a porous body of Niresist and AlN filled with Al alloy, or of a Ti—Si—C fiber-reinforced ceramics. The piston top portion is formed of Incoloy 903 or $Si_3N_4$.

The combustion chamber structure is installed in the piston body by casting. Further, a heat insulating material of ceramic fiber or PSZ flame-sprayed layer is interposed between the outer surface of the combustion chamber structure and the cavity wall surface of the piston body.

By installing the combustion chamber structure in the piston body by casting, it is possible to bring the combustion chamber structure and the piston body into firm engagement with each other at their boundary. This close contact of these members offers a good seal at the their boundary and therefore obviates the need for installing a seal member between them, simplifying the structure.

When the piston body is cast around the combustion chamber structure, a heat insulating material is put on the outer surface of the combustion chamber structure to form a heat insulating layer between the outer surface of the combustion chamber structure and the cavity wall surface of the piston body. This enhances the heat insulating performance of the combustion chamber substantially, minimizing release of heat energy from the combustion chamber and improving fuel cost.

Further, because of a rapid air movement as well as a large heat conduction and a high gas temperature in the combustion chamber, a large amount of heat is released. Hence, by constructing the combustion chamber in a heat insulating structure, it is possible to prevent heat dissipation and significantly improve thermal efficiency. In this case, the heat insulating material selected is preferably such as will not be burned or peeled off by casting molten metal.

The piston structure with a combustion chamber as the third embodiment of this invention is characterized in that the piston head portion of a heat-resistant material having a combustion chamber and constituting the whole area of the piston top surface is fixedly installed in the piston skirt portion by casting; that the lower surface of the piston head portion is formed as a tapered surface that inclines to the piston top side toward the outer periphery; that the upper surface of the piston skirt portion is formed as a tapered surface that extends along the opposing tapered surface of the piston head portion; that a heat insulating layer is formed between the lower surface of the piston head portion and the upper surface of the piston skirt portion; and that the lower outer circumferential surface of the piston head portion and the upper outer circumferential surface of the piston skirt portion are kept in firm contact.

When the piston head portion is fixed in the piston skirt portion by casting, the outer circumferential portion of the piston head portion is slightly deflected upward during casting. When the molten metal of the piston skirt portion solidifies, it contracts applying the axial contracting force to the piston head portion. Thus, the lower outer circumferential surface of the piston head portion and the upper outer circumferential surface of the piston skirt portion are placed in firm contact, providing a good seal at the outer circumferential boundary between them.

The heat insulating layer formed between the lower surface of the piston head portion and the upper surface of the piston skirt portion greatly enhances the heat insulating performance of the combustion chamber. The heat insulating layer is formed by installing during the process of casting a combustible material between the lower surface of the piston head portion and the upper surface of the piston skirt portion. The combustible material is burned when the engine is operated, to form a sealed space where the combustible material was. The space thus formed constitutes the heat insulating layer. In this case, the combustible material should preferably be the one that is not burned by the casting molten metal but by engine operation. A gasket may also be interposed between the lower outer circumferential surface of the piston head portion and the upper outer circumferential surface of the piston skirt portion so that the gasket is subjected to a compression stress as the piston skirt portion contracts during casting.

In this piston structure with a combustion chamber, the mounting portion of the piston head portion is fitted into the mounting hole of the piston skirt portion. and a metal joining member is installed plastically deformed between and extending into the mounting portion and the mounting hole to fix the piston head portion to the piston skirt portion. If the piston head portion is secured to the piston skirt portion made of metal by plastic deformation of a metal, i.e., metal flow, the outer circumferential portion of the piston head portion, which is made thin by the tapered surface, is slightly deflected upwardly during the metal flow, with the result that an axial vector of force generated by the tapered surface of the piston skirt portion is applied to the piston head portion. Hence, the lower outer circumferential surface of the piston head portion and the upper outer circumferential surface of the piston skirt portion are brought into hermetical contact, sealing the two members at the outer circumferential boundary in good condition, eliminating the need for installing a sealing member between them, simplifying the structure.

Alternatively, a gasket may be installed between the lower surface of the piston head portion and the upper surface of the piston skirt portion. The gasket is applied a compression stress when the piston head portion and the piston skirt portion are secured together by plastic deformation of the joining member. The gasket is mounted to the piston head portion near the mounting hole.

Because there is a heat insulating layer at the boundary between the piston head portion and the piston skirt portion, the combustion chamber has a substantially enhanced heat insulating performance, thus preventing heat dissipation from the combustion chamber to the piston skirt portion and improving the fuel efficiency. Particularly because of a rapid air flow as well as a large heat conduction and a high gas temperature in the combustion chamber, a large amount of heat is released. Hence, by constructing the combustion chamber in a heat insulating structure, it is possible to prevent heat dissipation and significantly improve thermal efficiency.

When the heat insulating air layer is formed around the piston outer circumference between the piston head portion and the piston skirt portion without providing a sealing gasket between them, the heat insulation level obtained is almost equal to that obtained with a structure that has a sealing gasket between the two members to offer perfect gas sealing. That is, even when the heat insulating air layer is not isolated from the combustion chamber by the sealing gasket, because the lower outer circumferential surface of the piston head portion and the upper outer circumferential surface of the piston skirt portion are in contact with each other, a thermal throttle is provided slowing the gas flow. As a result, the heat transfer coefficient between the two members becomes low, reducing the amount of heat transferred from the piston head portion to the piston skirt portion through the heat insulating air layer. The heat transfer coefficient is nearly proportional to the gas flow rate to the 0.8th power.

The mounting portion is a mounting shaft portion that projects from the circumferential wall portion or bottom wall portion that defines the combustion chamber. The joining member comprises a joining ring extending over the entire circumference or two or more joining pieces partly extending in the circumferential direction.

The piston head portion is formed with a nozzle insertion hole almost at the center through which the fuel injection nozzle projects into the combustion chamber, and with communication holes that are arranged, spaced from each other, in the circumferential direction of the nozzle insertion hole to communicate the combustion chamber to the main combustion chamber formed in the cylinder. The piston head portion can comprise a plate of heat-resistant ceramics formed with the nozzle insertion hole and the communication holes, and a piston head body of heat-resistant metal to which the plate is secured by plastic deformation of a metal.

Further, because the period during which the fuel injection nozzle stays in the combustion chamber, i.e., the closed period during which the nozzle insertion hole is closed by the incoming fuel injection nozzle is determined by the length of projection of the fuel injection nozzle from the lower surface of the cylinder head and the thickness of the nozzle insertion hole portion, the closed period can be controlled by appropriately selecting the projection length of the fuel injection nozzle and the thickness of the nozzle insertion hole portion.

The piston structure with a combustion chamber as the fourth embodiment of this invention comprises a piston that reciprocates in the cylinder; a combustion chamber formed in the piston and located at the center of the cylinder and whose volume ratio is set at 35–65%; a nozzle insertion hole formed in the piston top portion located at the center of the combustion chamber; a fuel injection nozzle having multiple spray holes which, as the piston nears the top dead center, enters through the nozzle insertion hole into the combustion chamber and sprays fuel toward an upper half, with respect to axial height, of the side wall surface of the combustion chamber; and communication holes formed, spaced from each other, in the piston top portion around the nozzle insertion hole to communicate the main combustion chamber formed in the cylinder and the combustion chamber, the communication holes having an area of 1.5–5% of the total area of the piston top surface.

The impinging angle of the sprayed fuel with respect to the side wall surface is set in the range of 90° to 120° on the communication holes side. The relation between the fuel spray direction and the side wall surface is relative. When, for example, the fuel spray direction is downward, the above impinging angle condition can be met if the inclination angle of the side wall surface is increased so that the side wall surface expands upwardly more than when the fuel spray direction is horizontal. Further, the number of the multiple spray holes of the fuel injection nozzle is set equal to the number of the communication holes formed in the piston top portion.

The fuel from the spray holes of the fuel injection nozzle is sprayed against the side wall surface of the combustion chamber and guided along the side wall surface toward the upper portion of the combustion chamber, i.e., near the communication holes. When the impinging angle of the sprayed fuel with respect the side wall surface is in the range of between 90° and 120°, then the sprayed fuel striking the wall tends to produce a greater amount of air-fuel mixture on the side where the impinging angle is greater than 90°, i.e., on the side where the communication holes are provided. Therefore, a greater amount of the mixture is produced reliably and stably in the area within the combustion chamber near the communication holes.

As described above, rich mixture is produced in the upper part of the combustion chamber close to the communication holes and, in the lower part, the mixture is lean. Because most of the mixture is formed near the communication holes, the mixture produced in the combustion chamber is ejected through the communication holes into the main combustion chamber while burning. The flame and unburned air-fuel mixture gas is quickly ejected into the main combustion chamber in a single blow. The ejected mixture is then mixed with fresh air present in the main combustion chamber accelerating its combustion. This reduces the burning time in the main combustion chamber and therefore can complete the combustion process in the main combustion chamber, minimizing the emissions such as HC and smoke, which in turn prevents the generation of white smoke and increases the engine output, improving the thermal efficiency and fuel efficiency. Moreover, because the mixture is ejected into the main combustion chamber while mixing with unburned gas, a kind of EGR effect is produced limiting the generation of NOx emissions. Therefore, even if the flame and unburned air-fuel mixture gas is ejected early from the precombustion chamber through the communication holes into the main combustion chamber, the amount of NOx emissions is not increased.

Further, because the mixture is generated near the communication holes, it is not easy for the mixture to stay in the lower part of the combustion chamber. This means that no mixture remains in the combustion chamber in a late stage of the combustion process, so that a major portion of the mixture is effectively ejected into and burned in the main combustion chamber, enhancing the thermal efficiency and improving fuel efficiency.

Further, as the combustion in the combustion chamber advances, the mixture in the combustion chamber is ejected into the main combustion chamber and mixes with air in it. Some gas may stay in the combustion chamber in the late stage of combustion process, rather than being ejected into the main combustion chamber, before one combustion cycle is completed. At this time, if the mixture generated in the combustion chamber is uniform in concentration, the residual mixture in the combustion chamber at the late combustion stage remains unburned and wasted. Not only is this residue not converted into output, but it produces HC emissions, deteriorating the exhaust gas performance. To cope with this problem, a rich mixture part and a lean mixture part are provided in the combustion chamber so that the rich mixture gas is ejected in the early stage of combustion process with only the lean mixture gas or air left in the combustion chamber in the late stage. This spatial distribution of mixture concentration in the combustion chamber results in a significant improvement of the engine performance and exhaust gas characteristic.

Furthermore, because the number of the multiple spray holes of the fuel injection nozzle is set equal to that of the communication holes formed in the piston top portion, a number of mixtures—generated in the combustion chamber by spraying fuel from the spray holes of the fuel injection nozzle—are formed in one-to-one correspondence with and close to the communication holes. These mixtures thus formed, i.e., flame and unburned mixture gases, are ejected quickly through the corresponding communication holes into the main combustion chamber in a single blow.

DETAILED DESCRIPTION OF THE PREFERRED EMBODIMENTS

Figure 1:
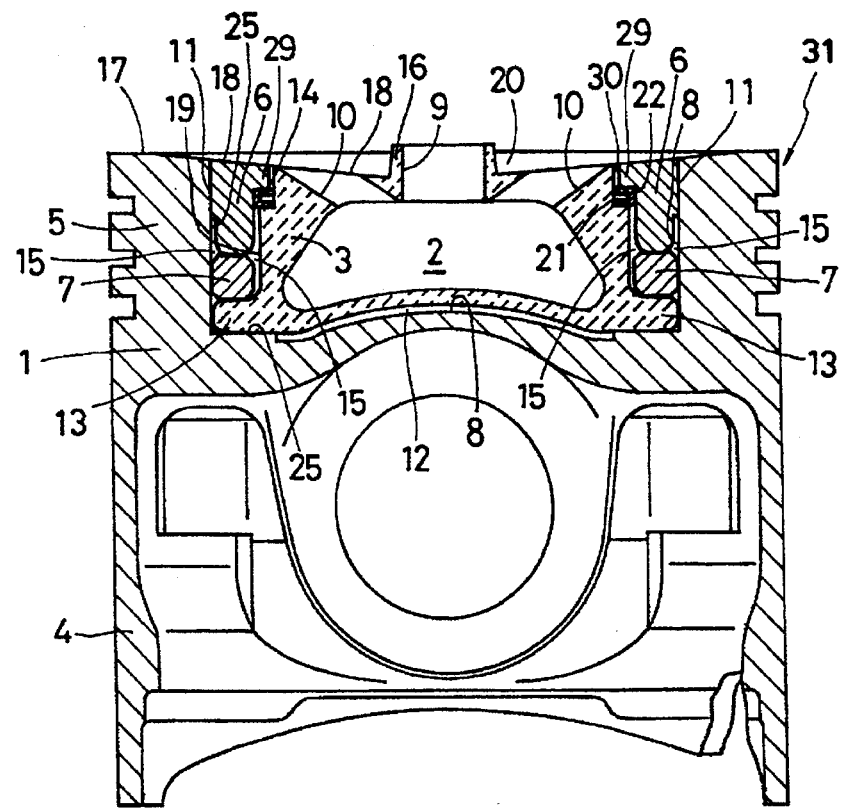
FIG. 1 is a cross section of a piston structure with a combustion chamber as one embodiment of this invention.
Figure 2:
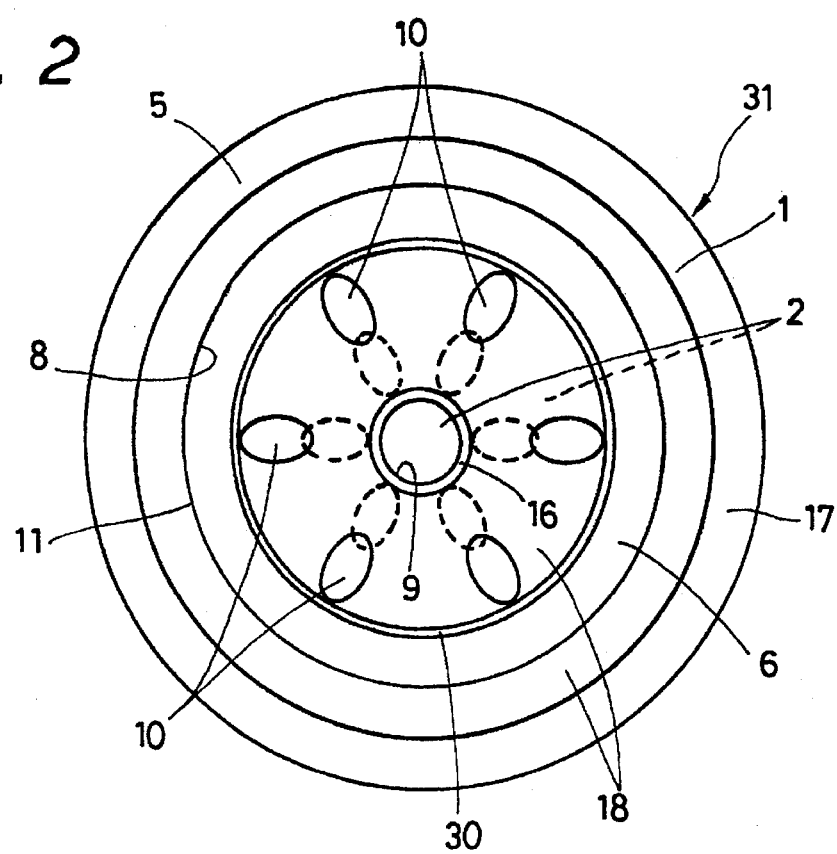
FIG. 2 is a plan view of the piston of FIG. 1.

By referring to the accompanying drawings, embodiments of the piston structure with a combustion chamber according to this invention are described. In FIGS. 1 through 29, components that are identical are given like reference numerals and their repetitive descriptions are omitted.

An engine with a precombustion chamber, which incorporates the piston structure having a combustion chamber of this invention, comprises, though not shown, a cylinder block made of a metal material such as cast iron and aluminum alloy in which cylinders are formed, and a cylinder head made of such a metal material as aluminum alloy that is secured to the cylinder block through a gasket. The cylinder block is provided with bores the number of which corresponds to that of engine cylinders. The bores may be fitted with cylinder liners that form the cylinders. The cylinder head is formed with the number of intake and exhaust ports that corresponds to the number of engine cylinders. Intake and exhaust valves are installed at the intake and exhaust ports. In the cylinders formed in the cylinder block pistons are installed so that they can reciprocate. A main combustion chamber 20 is a cylinder chamber formed on the cylinder side between the underside of the cylinder head and the top surface 17 of the piston and, in FIG. 1, also includes a recess formed by a tapered surface 18 on the top surface 17.

The engine with a precombustion chamber, which has a combustion chamber-incorporated piston structure, is a diesel engine that injects a liquid fuel from a fuel injection nozzle (which corresponds to a reference numeral 40 that appears later) into a precombustion chamber, the combustion chamber 2, for burning. This engine is characterized in the structure of a piston 31 that reciprocates in the cylinder. This piston structure comprises a piston body 1 having a piston head portion 5 and a piston skirt portion 4, a combustion chamber structure 3 installed in a cavity 8 formed in the piston body 1 with heat insulating air layers 12, 15 in between, and a mounting ring 6 made of the same kind of material as the piston body 1 to fix the combustion chamber structure 3 to the piston body 1.

This embodiment comprises, in particular: a piston body 1 made of a metal material having a cavity 8 formed around the center axis of the piston 31 as a center; a combustion chamber structure 3 made of a heat-resistant high-temperature, high-strength material, which is installed in the cavity 8 with the heat insulating air layer 12 interposed therebetween and which has formed almost at the center of the piston a combustion chamber 2 having a nozzle insertion hole 9 and communication holes 10 spaced from each other and formed around the nozzle insertion hole 9; and a mounting ring 6 made of almost the same kind of material as the piston body 1, placed in contact with the piston body 1, and installed in the cavity 8 and around the outer periphery of the combustion chamber structure 3 to fix the combustion chamber structure 3 in the cavity 8. Although the mounting ring 6 is not limited to a high thermal expansion material, it is basically preferred that the mounting ring 6 be made from the same kind of material as the piston body 1, considering the weldability. If a brazing material is used for welding the mounting ring 6 to the piston body 1, however, the mounting ring 6 need not be formed of exactly the same material as the piston body 1. This is the reason that the mounting ring 6 is made of almost the same kind of material as the piston body 1.

Between the top surface of a projection 13 formed at the lower periphery of the combustion chamber structure 3 and the bottom surface of the mounting ring 6 is installed a thermal expansion control member 7 made of a high linear expansion material, i.e., a high thermal expansion material. The nozzle insertion hole 9 is located almost at the center of the piston and the fuel injection nozzle provided to the cylinder head enters into the combustion chamber 2 through the nozzle insertion hole 9 when the piston nears the top dead center. The wall of the nozzle insertion hole 9 forms a guide cylinder 16, whose length adjusts the period during which the fuel injection nozzle protrudes into the combustion chamber 2. The required expansion coefficient of the thermal expansion control member 7 is determined by the thermal expansion coefficient of the combustion chamber structure 3 that forms the combustion chamber 2. Because the thermal expansion coefficient of the combustion chamber structure 3 varies greatly depending on whether it is made from $Si_3N_4$ or a heat-resistant metal such as Incoloy 903, the thermal expansion coefficient of the thermal expansion control member 7 also changes.

That is, when the combustion chamber structure 3 is formed of, for example, $Si_3N_4$, the thermal expansion control member 7 needs to be made of a material with large thermal expansion coefficient. Whereas, when the combustion chamber structure 3 is made of other material than $Si_3N_4$, the thermal expansion control member 7 should be formed of a different material. In more concrete terms, if the combustion chamber structure 3 is made of $Si_3N_4$, the thermal expansion control member 7 is formed of a material with large thermal expansion coefficient such as magnesium alloy. If the combustion chamber structure 3 is made of a heat-resistant metal, the thermal expansion control member 7 is formed of a material with relatively large thermal expansion coefficient such as aluminum alloy and stainless steel material.

The piston body 1 is made of a metal such as aluminum alloy (AC8A, LO-EX), whose thermal expansion coefficient is $20-21\times10^{-6}/°$ C. The combustion chamber structure 3 is constructed of the same kind of metal as the piston body 1, such as aluminum alloy (A5052), that allows its welding to the piston body 1 by beam welding or laser welding. The piston body's thermal expansion coefficient in this case is $23\times10^{-6}/°$ C. The combustion chamber structure 3 is formed of either a heat-resistant metal such as Incoloy or a heat-resistant, high-temperature high-strength material such as a heat-resistant ceramics $Si_3N_4$. When it is made of $Si_3N_4$, its thermal expansion coefficient is $3.2\times10^{-6}/°$ C. The thermal expansion control member 7 is formed of a magnesium alloy and its thermal expansion coefficient is $26\times10^{-6}/°$ C.

In the piston structure with this combustion chamber, there is formed a gap 30 between the inner circumferential surface of the mounting ring 6 and the upper outer circumferential surface 19 of the combustion chamber structure 3. The upper outer circumferential surface of the mounting ring 6 and a cavity wall surface 25 of the piston body 1 are welded together by beam welding or laser welding to form a joint 11 at a part of their boundary surface. There is a heat insulating air layer 15 or a gap between the lower outer circumferential surface of the mounting ring 6 and the cavity wall surface 25 of the piston body 1. In other words, the upper portion of the mounting ring 6 on the piston top surface 17 side is welded to the piston body 1, while the lower portion of the mounting ring 6 has a gap, i.e., the heat insulating air layer 15 between it and the piston body 1. Further, the upper inner circumferential surface of the mounting ring 6 is provided with an inwardly protruding locking portion 29, whose underside or undercut portion 22 engages, through a sealing gasket 14, with a step portion 21 formed in the upper outer circumferential surface of the combustion chamber structure 3. That is, the sealing gasket 14 is interposed between the undercut portion 22 formed on the inner circumferential surface of the mounting ring 6 and the step portion 21 formed on the outer circumferential surface 19 of the combustion chamber structure 3; and the heat insulating air layer 15 of an enclosed space is formed between the inner circumferential surface of the mounting ring 6 and the outer circumferential surface 19 of the combustion chamber structure 3. In this embodiment, the gap 30 between the mounting ring 6 and the combustion chamber structure 3 can allow for a thermal expansion difference between the piston body 1 and the combustion chamber structure 3. The thermal expansion difference can be elastically absorbed by the sealing gasket 14.

The combustion chamber structure 3 has a precombustion chamber, i.e., a combustion chamber 2 located almost at the center of the cylinder or piston, the nozzle insertion hole 9 located at the center of the combustion chamber 2, and a number of communication holes 10 (in FIG. 2, six) arranged around the nozzle insertion hole 9 and spaced apart from each other. The communication holes 10 are formed inclined toward the cylinder periphery and arranged along the circumference of the nozzle insertion hole 9. The cylinder head has secured thereto a fuel injection nozzle with multiple spray holes which is arranged at the center of the cylinder axis. The spray portion of the fuel injection nozzle projects from the underside of the cylinder head. As the piston nears the top dead center, the injection holes of the fuel injection nozzle secured to the cylinder head go into the nozzle insertion hole 9, spraying the fuel from the injection holes into the combustion chamber 2. The cylinder head may be provided with a glow plug as an auxiliary device for starting and the piston head portion 5 formed with a plug hole so that the glow plug goes into the combustion chamber 2 when the piston nears the top dead center.

In this embodiment, a number of communication holes 10 are formed around the nozzle insertion hole 9 to make the passage area of the communication holes 10 distributed along the entire circumference covering a wide area so that the flame and the air-fuel mixture ejected out of the communication holes 10 can mix well with air in the main combustion chamber 20. That is, the communication holes 10 connecting the combustion chamber 2 to the main combustion chamber 20 can be made large in its total passage area so that a throttling loss can be reduced, eliminating a fall in the output. Because the combustion chamber 2 is arranged concentric with the center axis of the cylinder and the communication holes 10 are formed at the outer circumferential surface of the combustion chamber 2, even if the increased passage area of the communication holes 10 reduces the ejection energy and the distance the jet flow out of the combustion chamber 2 travels is reduced, the jet flow can mix well with the air in the main combustion chamber 20 in a short period of time. This reduces the burning period in the main combustion chamber 20 and limits the production of HC and smoke.

Figure 3:
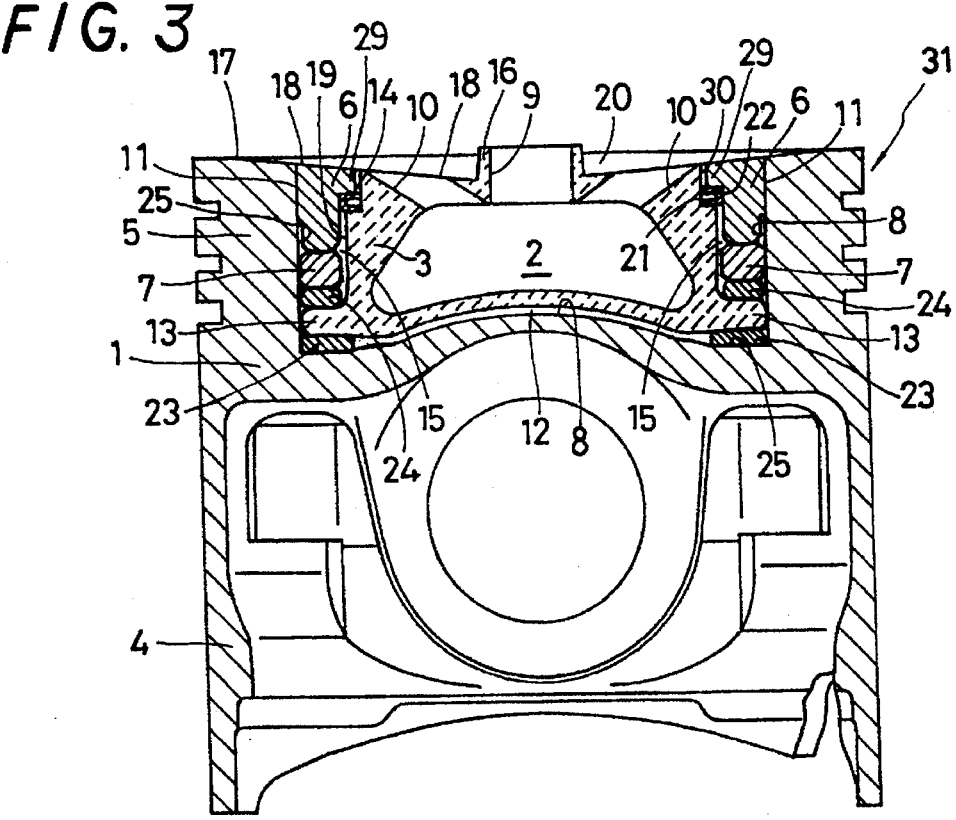
FIG. 3 is a cross section of a piston structure with a combustion chamber as another embodiment of this invention.

FIG. 3 shows another embodiment of this invention. This embodiment has a low heat conducting member 24 between the thermal expansion control member 7 and the top surface of the projection 13 of the combustion chamber structure 3, and a low heat conducting member 23 between the bottom surface of the projection 13 and the cavity wall surface 25 of the piston body 1. The low heat conducting members 23, 24 are made of such materials as partly stabilized zirconia PSZ.

Figure 4:
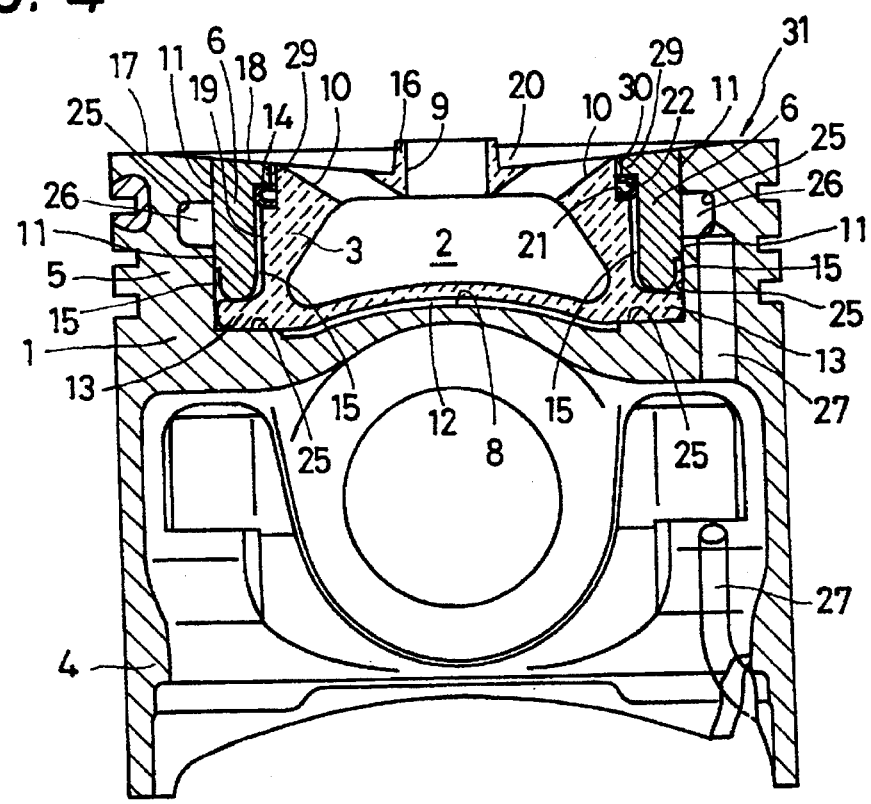
FIG. 4 is a cross section of a piston structure with a combustion chamber as a further embodiment of this invention.
Figure 5:
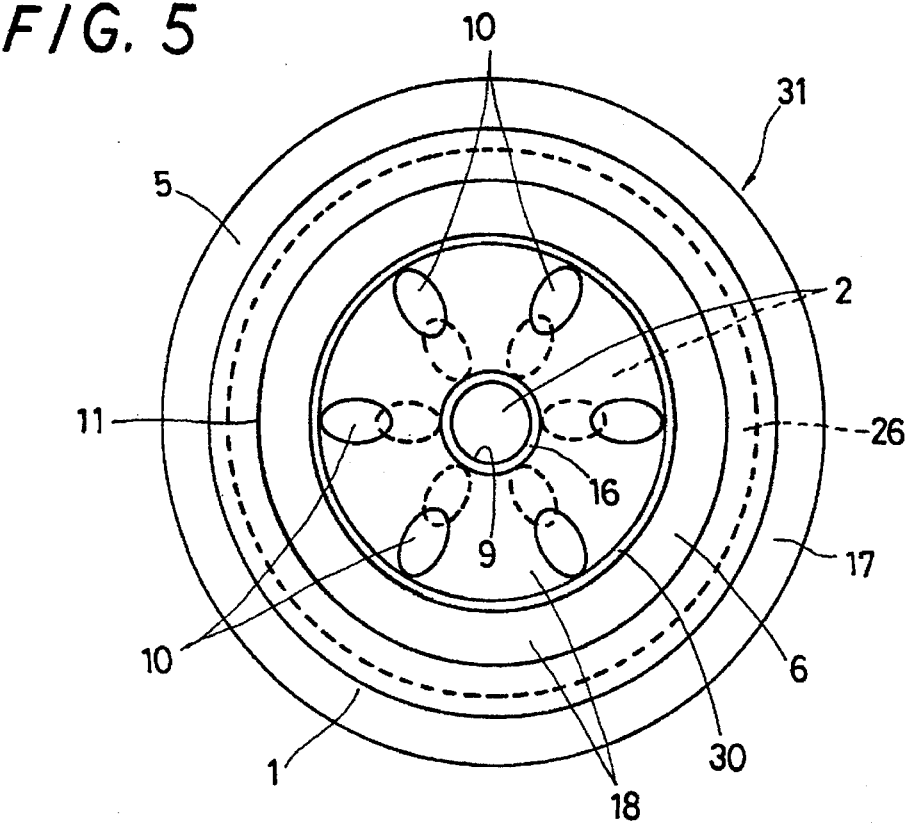
FIG. 5 is a plan view of the piston of FIG. 4.

FIGS. 4 and 5 show still another embodiment of this invention. In this embodiment, cooling passages 26, 27 communicating to the lower part the piston body 1 are formed between the outer circumferential surface of the mounting ring 6 and the cavity wall surface 25 of the piston body 1. The outer circumferential surface of the mounting ring 6 above and below the cooling passages 26, 27 and the cavity wall surface 25 of the piston body 1 are joined together at their boundary surface, with the cooling passage 26 closed to the tapered surface 18 on the piston top surface 17 but connected to the lower part of the piston body 1 through the cooling passage 27. Thus, oil from the crank chamber is circulated through the cooling passage 27 to the cooling passage 26 to cool the piston body 1 surrounding the combustion chamber structure 3 and keep it at low temperatures. The combustion chamber 2 formed in the combustion chamber structure 3 is kept at high temperatures by the presence of the heat insulating air layer 15. Although this embodiment has neither a high thermal expansion member nor a low heat conducting member interposed between the mounting ring 6 and the projection 13 of the combustion chamber structure 3, the function of the high thermal expansion member can be fully provided by making the mounting ring 6 from almost the same kind of material as the piston body 1 and flowing oil through the cooling passages 26, 27 to cool the outer circumferential surface of the mounting ring 6.

Figure 6:
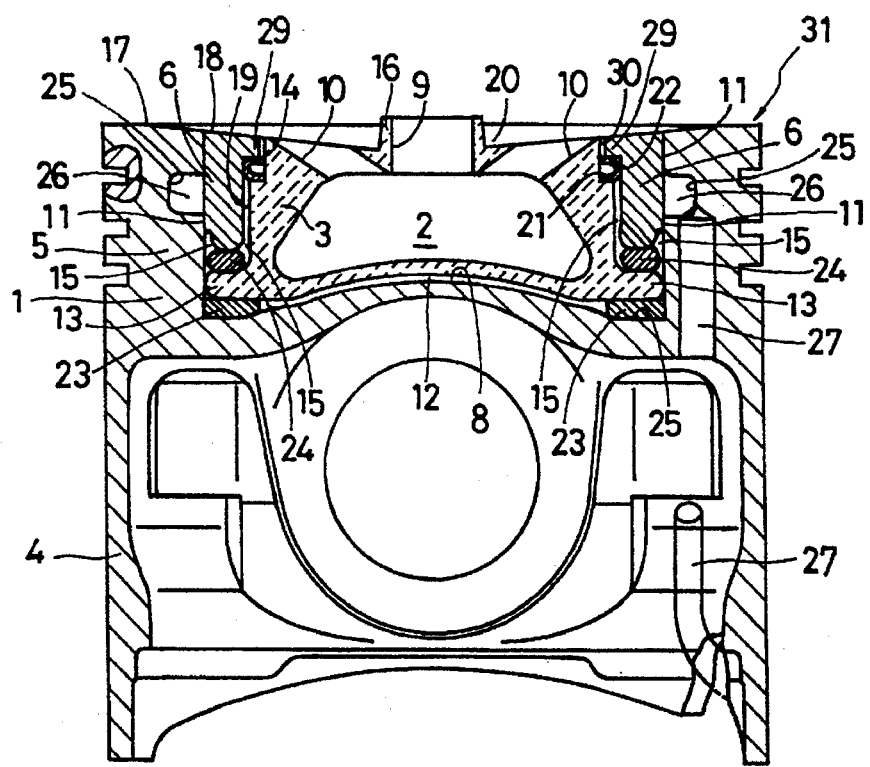
FIG. 6 is a cross section of a piston structure with a combustion chamber as a further embodiment of this invention.

FIG. 6 shows a further embodiment of this invention. This embodiment has the low heat conducting member 24 interposed between the top surface of the projection 13 provided to the outer periphery of the combustion chamber structure 3 and the lower end surface of the mounting ring 6, and the low heat conducting member 23 interposed between the bottom surface of the projection 13 and the cavity wall surface 25 of the piston body 1.

Figure 7:
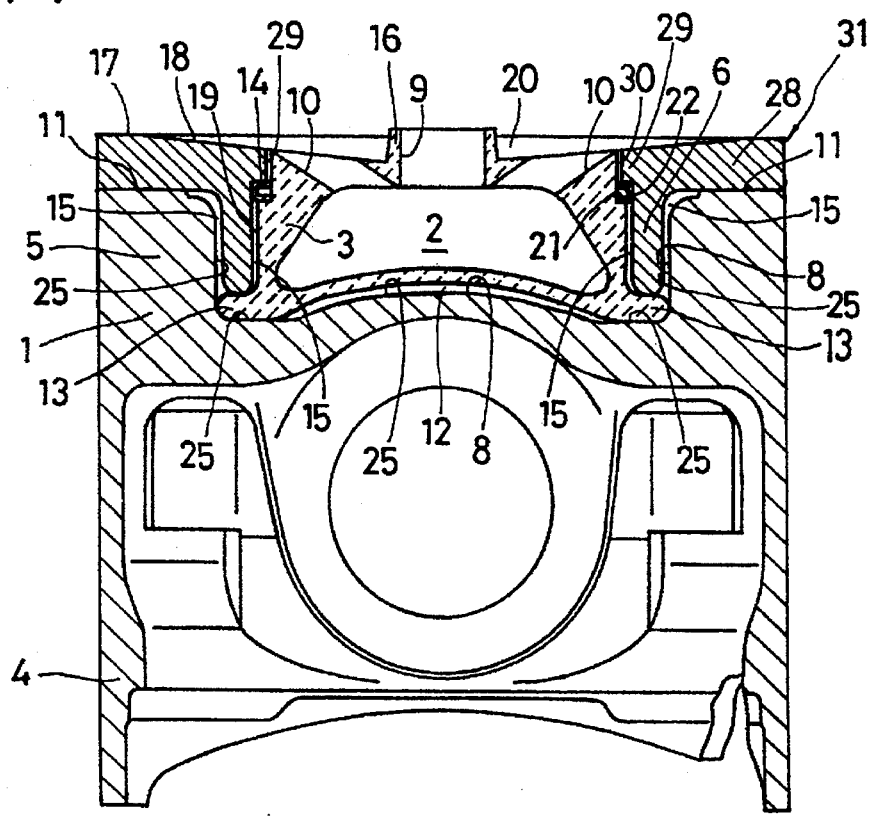
FIG. 7 is a cross section of a piston structure with a combustion chamber as a further embodiment of this invention.
Figure 8:
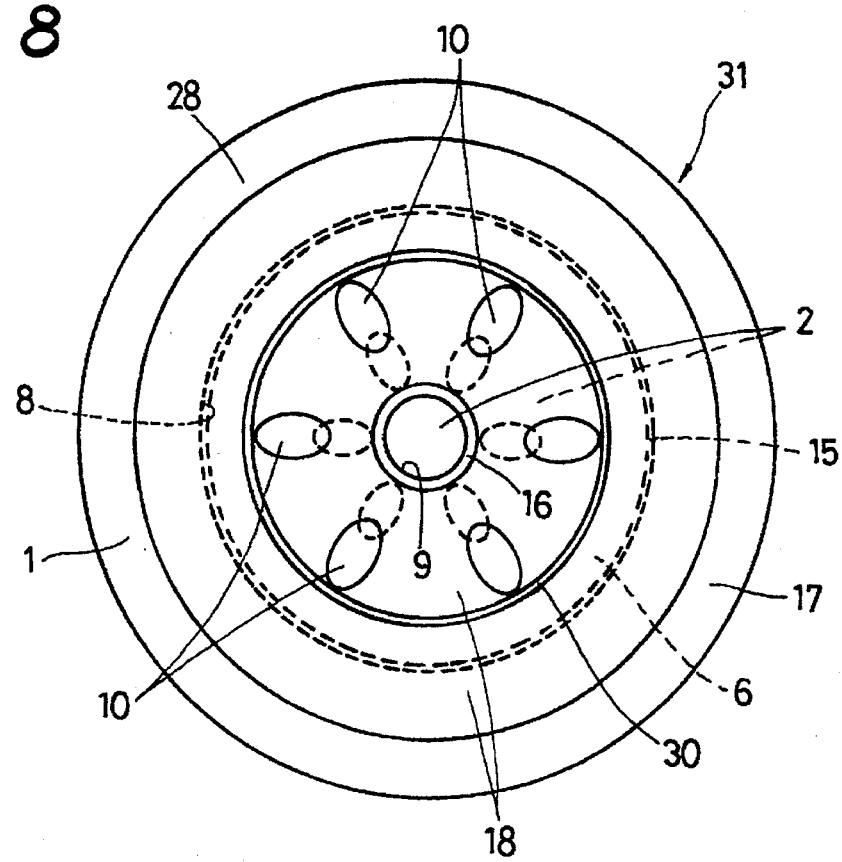
FIG. 8 is a plan view of the piston of FIG. 7.

FIGS. 7 and 8 show a further embodiment of this invention. In this embodiment, the mounting ring 6 has a piston top portion 28 that extends to the periphery of the piston, with the underside of the mounting ring 6 joined with the upper surface of the piston body 1.

Figure 9:
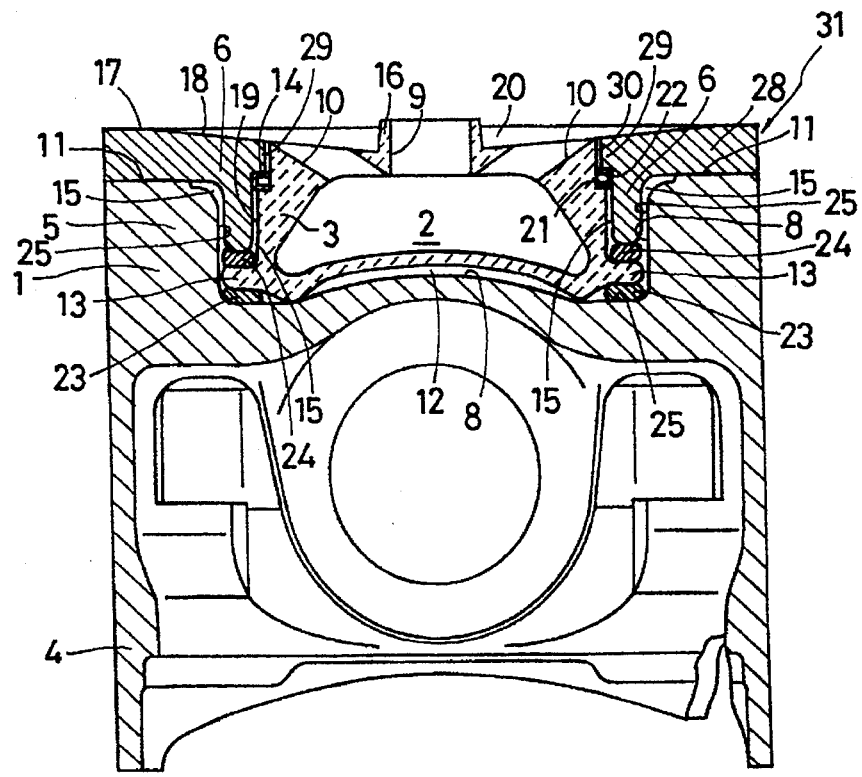
FIG. 9 is a cross section of a piston structure with a combustion chamber as a further embodiment of this invention.

FIG. 9 shows a further embodiment of this invention. This embodiment has the low heat conducting member 24 interposed between the top surface of the projection 13 provided to the outer periphery of the combustion chamber structure 3 and the lower end surface of the mounting ring 6 and the low heat conducting member 23 interposed between the bottom surface of the projection 13 and the cavity wall surface 25 of the piston body 1.

Figure 10:
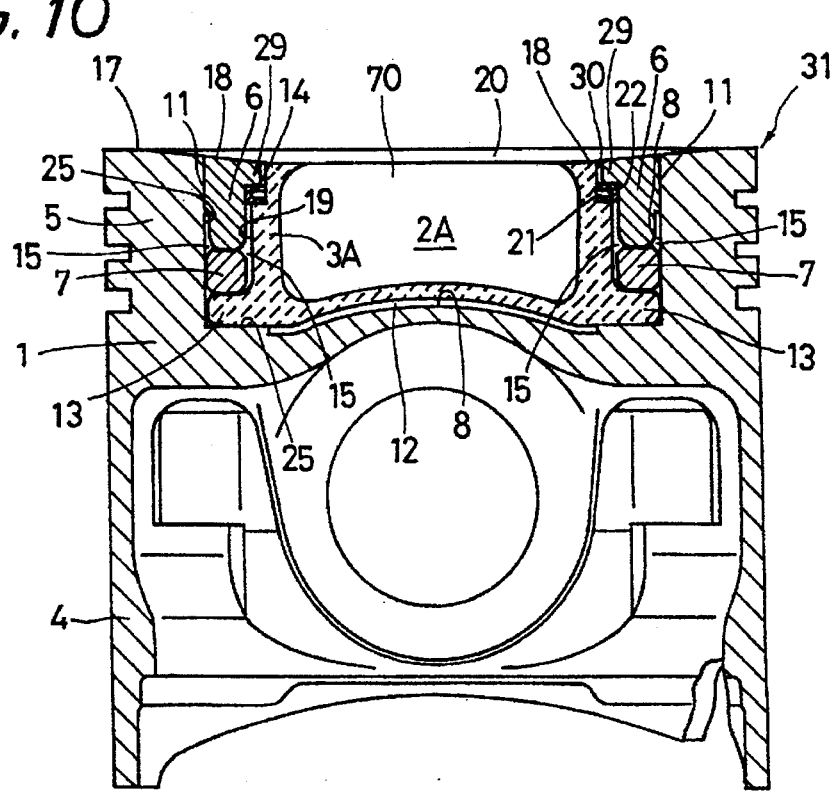
FIG. 10 is a cross section of a piston structure with a combustion chamber as a further embodiment of this invention.

FIG. 10 shows a further embodiment of this invention. This embodiment concerns a piston structure, which has a main combustion chamber 20, i.e. a combustion chamber 2A, formed in a combustion chamber structure 3A. The structure of this embodiment in which the combustion chamber structure 3A is fixed to the cavity 8 of the piston body 1 by the mounting ring 6 is similar to that of the previous embodiment of FIG. 1, in which the combustion chamber structure 3 is fixed to the cavity 8 of the piston body 1 by the mounting ring 6. These two structures offer the same functions and effects. Because an opening 70 that forms the combustion chamber 2A doubles as the nozzle insertion hole and the communication holes, this embodiment differs in this point from the preceding embodiments, which have the nozzle insertion hole and the communication holes.

Further, the shape of the combustion chamber of this embodiment shown in FIG. 10 can be applied to the previous embodiments of FIGS. 3, 4, 6, 7 and 9. These embodiments that employ the combustion chamber of FIG. 10, though not shown, correspond to the piston structures having a combustion chamber formed as a main combustion chamber in the combustion chamber structure 3 of FIGS. 3, 4, 6, 7 and 9. These embodiments have the mounting structures similar to those shown in these figures for installing the combustion chamber structure into the piston body. So, their explanations are not given here. Although the previous embodiments concern the structure in which the combustion chamber is formed at almost the center of the piston body 1, the fixing of the combustion chamber structure to the piston body can be achieved by other constructions. Among them, though not shown, are constructions in which the combustion chamber is formed off-center in the piston body, in which the opening of the combustion chamber is tapered off toward the end, or in which the combustion chamber is formed with a throat.

Figure 11:
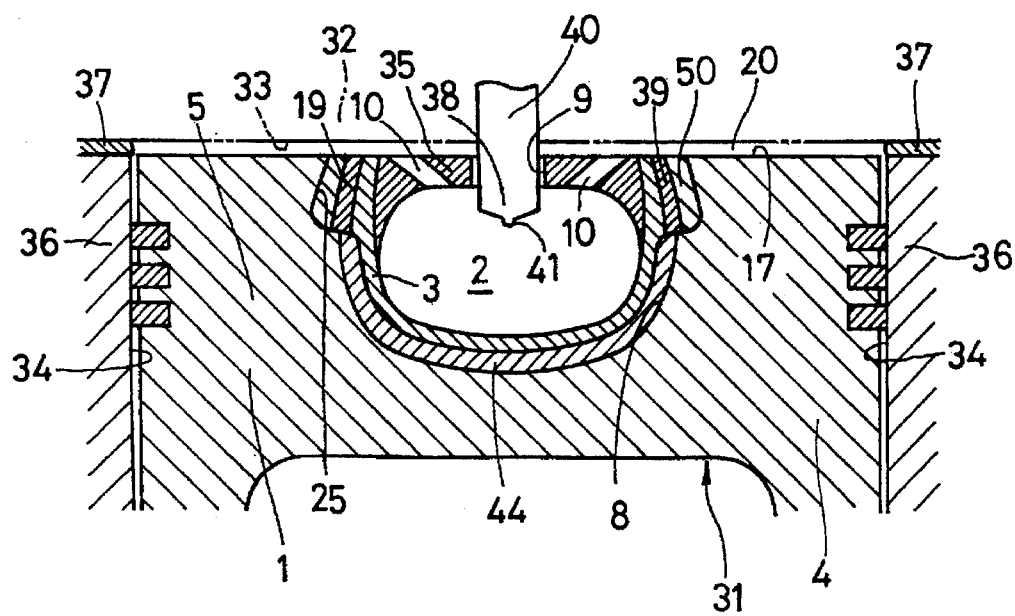
FIG. 11 is a cross section of a piston structure with a combustion chamber as a further embodiment of this invention.
Figure 12:
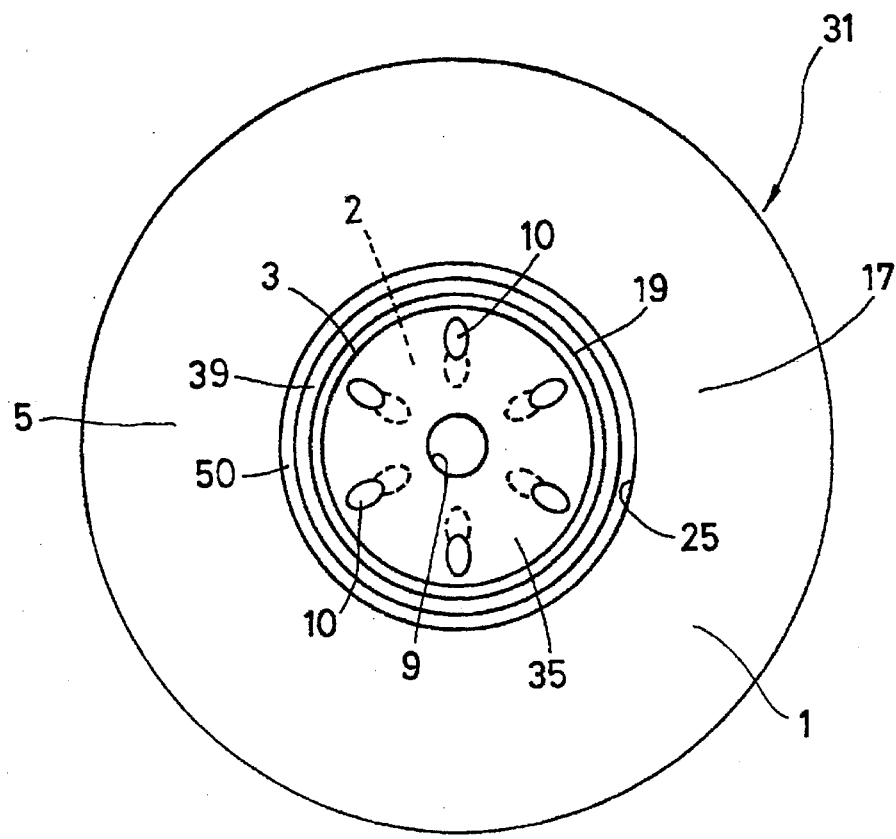
FIG. 12 is a plan view of the piston with a combustion chamber of FIG. 11.

Next, by referring to FIGS. 11 and 12, a further embodiment of this invention is described. The engine with a precombustion chamber that has a combustion chamber-incorporated piston structure comprises a cylinder block 36 made of a metal material such as aluminum alloy and forming a cylinder 34, and a cylinder head 32 made of a metal material such as aluminum alloy and fixed to the cylinder block 36 through a gasket 37. The cylinder block 36 has formed therein the same number of bores as that of cylinders of the engine. The bores may be fitted with a cylinder liner that forms the cylinder 34. The cylinder head 32 is formed with the same number of intake and exhaust ports (not shown) as that of the cylinders 34, and the intake and exhaust ports are provided with intake and exhaust valves (not shown). The cylinders 34 formed in the cylinder block 36 each accommodate a piston 31 that reciprocates in the cylinder. The main combustion chamber 20 is a cylinder chamber formed in the cylinder 34 between the bottom surface 33 of the cylinder head and the piston top surface 17. The piston 31 is formed with a combustion chamber (precombustion chamber) 2.

This invention concerns a diesel engine in which a liquid fuel is injected from a fuel injection nozzle 40 into the combustion chamber 2 for burning, and is characterized in the unique structure of the piston 31 that reciprocates in the cylinder 34. The piston 31 comprises: a piston body 1 having a piston head portion 5 and a piston skirt portion 4; a combustion chamber structure 3 installed in the cavity 8 of the piston body 1 with an heat insulating material 44 interposed therebetween; and a platelike piston top portion 35 secured to the top of the combustion chamber structure 3. The combustion chamber structure 3 is formed of a composite material consisting of heat-resistant silicon nitride, silicon carbide or ceramic whisker and metal, or of Inconel 903 or Ni—Cr-based heat-resistant alloy. The piston body 1 is made of a metal material such as aluminum alloy. The combustion chamber structure 3 has a combustion chamber 2 located almost at the center of the cylinder 34, a nozzle insertion hole 9 at the center of the combustion chamber 2, and a plurality of communication holes 10 (in FIG. 2, six) spaced from each other in the circumferential direction of the nozzle insertion hole 9. The communication holes 10 are formed inclined toward the cylinder periphery and arranged along the circumferential direction of the nozzle insertion hole 9.

The cylinder head 5 is secured with the fuel injection nozzle 40, which is located at the center of the cylinder shaft and has an injection opening 41, with an injection opening portion 38 of the fuel injection nozzle 40 protruding from the cylinder head bottom surface 33. As the piston nears the top dead center, the injection opening portion 38 of the fuel injection nozzle 40 passes through the nozzle insertion hole 9 into the combustion chamber 2 where it ejects a fuel from the injection opening 41. Though not shown, a glow plug as an auxiliary device for starting may be installed on the cylinder head 32 and a plug insertion hole formed in the combustion chamber structure 3 so that the glow plug can enter into the combustion chamber 2 when the piston is near the top dead center.

In this embodiment, the combustion chamber 2 is formed in the cavity 8 formed almost at the center of the piston 31. The piston top portion 35 is formed with the nozzle insertion hole 9 through which the fuel injection nozzle 40 secured to the cylinder head 32 can enter into the combustion chamber 2 as the piston nears the top dead center, and also with a plurality of communication holes 10 spaced from each other in the circumferential direction of the nozzle insertion hole 9 and communicating the combustion chamber 2 to the main combustion chamber 20. This embodiment is characterized in that the combustion chamber structure 3 forming the combustion chamber 2 is formed of a heat-resistant alloy with a small thermal expansion and that the outer wall surface 19 of the combustion chamber structure 3 and the cavity wall surface 25 of the piston body 1 are joined together by joint members 39, 50 that have a thermal expansion coefficient intermediate between those of the piston body 1 and the combustion chamber structure 3. Although the joint members 39, 50 are shown as two separate members, they may be formed as a member having a gradient of thermal expansion that increases from the combustion chamber structure 3 toward the piston body 1. This thermal expansion gradient member may be fabricated, for example, by stacking materials of different thermal expansion coefficients concentrically, rotating them by a centrifugal casting to form a laminated-layer body and then sintering the laminated-layer body. The thermal expansion gradient member offers an increased freedom for the thermal expansion coefficients of the joint members 39, 50.

The piston top portion 35 of the combustion chamber structure 3 is made of heat-resistant Incoloy 903 with small thermal expansion, and is joined to the combustion chamber structure 3 through metal flow. The joint members 39, 50 are formed of a thermal expansion gradient member whose thermal expansion increases from the combustion chamber structure 3 toward the piston body 1. The joint member 50 adjoining the piston body 1, when the piston body 1 is made of aluminum alloy, is preferably formed of Niresist having a thermal expansion coefficient close to that of aluminum alloy. The combustion chamber structure 3 and the joint member 39, both formed of heat-resistant metal, can be joined by beam welding.

Between the outer surface of the combustion chamber structure 3 and the cavity wall surface 25 of the cavity 8 of the piston body 1, there is installed a heat insulating material 44 made of a ceramic fiber or a plasma spray layer of partly stabilized zirconia (PSZ). The heat insulating material 44 can be placed between the combustion chamber structure 3 and the piston body 1 by putting the heat insulating material 44 over the outer surface of the combustion chamber structure 3 and casting the piston body 1 with aluminum alloy. That is, the ceramics fiber is made to adhere to the outer surface of the combustion chamber structure 3 and then the piston body 1 is cast, thus installing the heat insulating material 44 between them. It can also be interposed by flame-spraying the partly stabilized zirconia, which forms the heat insulating material 44, over the outer surface of the combustion chamber structure 3.

Further, a number of communication holes 10 are formed around the nozzle insertion hole 9 to distribute the passage area of the communication holes 10 over the entire circumference to increase the passage area, thereby allowing the flame and air-fuel mixture ejected from the communication holes 10 to mix thoroughly with air in the main combustion chamber 20. That is, the communication holes 10 for connecting the main combustion chamber 20 and the combustion chamber 2 can be made large in the total passage area, which in turn reduces the throttling loss and eliminates a reduction in the output. The combustion chamber 2 is centered concentrically at the cylinder center axis and the communication holes 10 are arranged around the outer periphery of the combustion chamber 2. This construction allows the jet flow coming out of the combustion chamber 2 through the communication holes 10 to mix well with air in the main combustion chamber 20 in a short time even when the fuel ejection energy is reduced, because the distance the jet travels is shortened by a number of communication holes 10. This in turn makes it possible to reduce the combustion period in the main combustion chamber 20 and limit the emissions such as HC and smoke.

Figure 13:
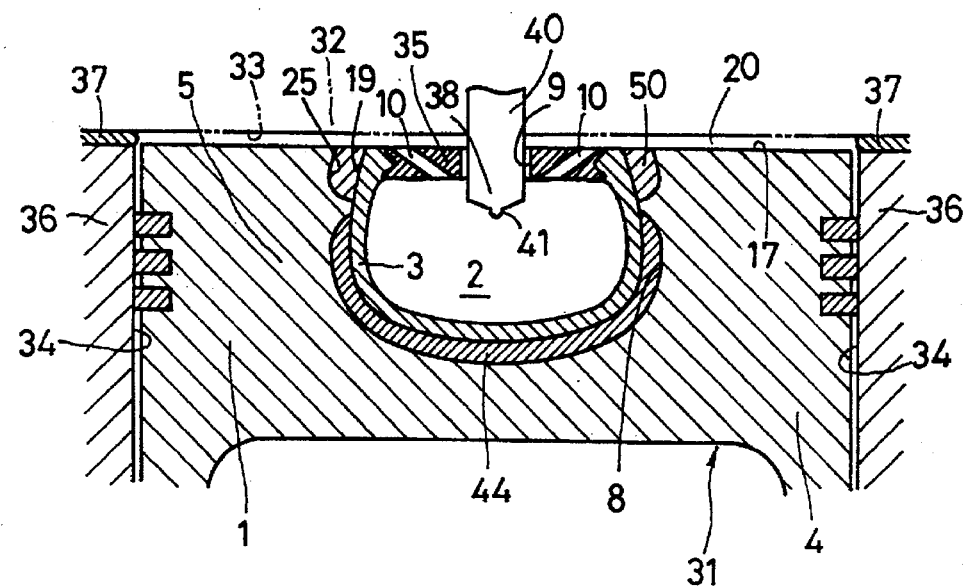
FIG. 13 is a cross section of a piston structure with a combustion chamber as a further embodiment of this invention.
Figure 14:
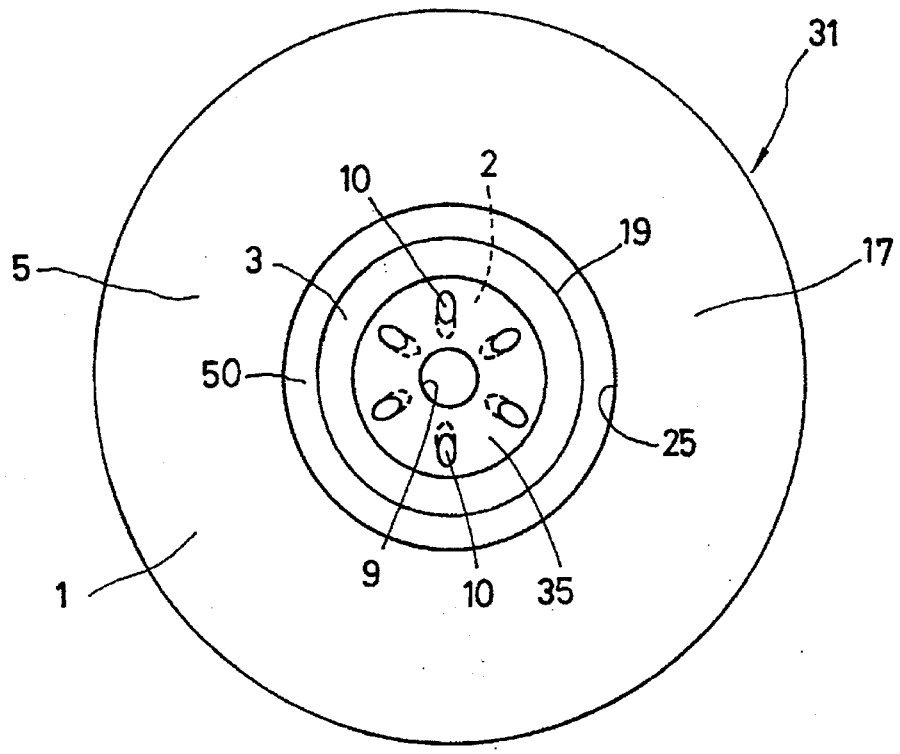
FIG. 14 is a plan view of the piston with a combustion chamber of FIG. 13.

Next, by referring to FIGS. 13 and 14, a further embodiment of the piston structure with a precombustion chamber according to this invention is explained. A piston top portion 35 of the combustion chamber structure 3 is made of a heat-resistant $Si_3N_4$ ceramics with small thermal expansion. When the piston body 1 is made of aluminum alloy, the piston top portion 35 is preferably formed of Niresist having a thermal expansion coefficient close to that of aluminum alloy. The combustion chamber structure 3 and the joint member 50, both formed of a heat-resistant metal, may be joined together as by beam welding. When the piston top portion 35 is made of $Si_3N_4$ ceramics, the piston structure can be made light in weight and reduce its inertia, minimizing adverse effects of the inertia on the joint portion. Because $Si_3N_4$ has a small thermal expansion coefficient, the thermal deformation of the combustion chamber 2 is small, thus reducing unwanted influences of thermal stresses and improving durability.

Figure 15:
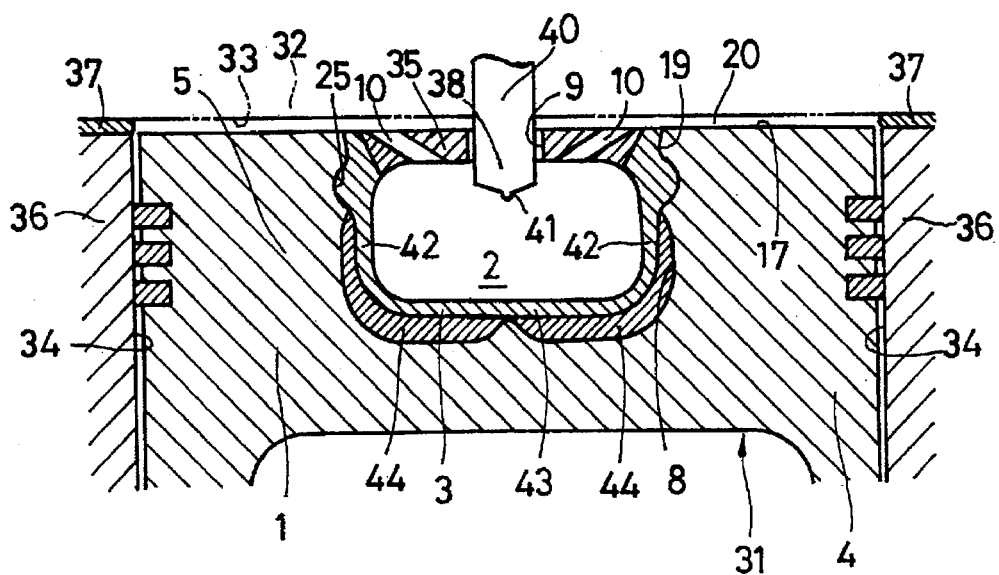
FIG. 15 is a cross section of a piston structure with a combustion chamber as a further embodiment of this invention.
Figure 16:
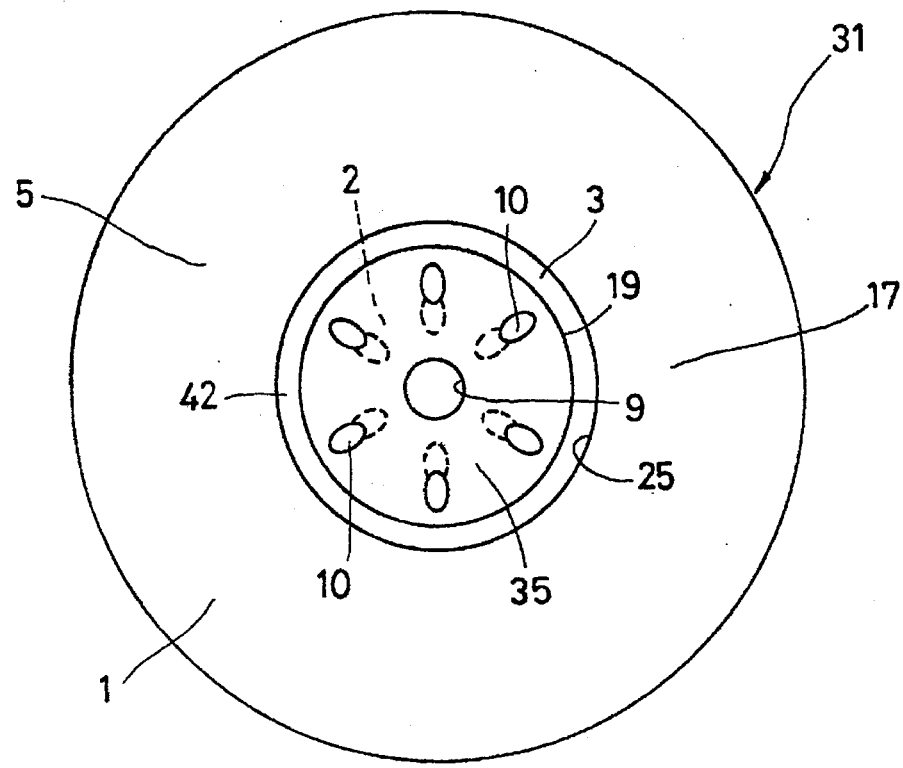
FIG. 16 is a plan view of the piston with a combustion chamber of FIG. 15.

Next, by referring to FIGS. 15 and 16, a further embodiment of the piston structure with a precombustion chamber according to this invention is described. A piston top portion 35 is made of a heat-resistant alloy or a heat-resistant ceramics. A circumferential wall 42 and a bottom wall 43 of the combustion chamber structure 3 are formed of a heat-resistant alloy having a thermal expansion coefficient intermediate between those of the piston top portion 35 and the piston body 1. The circumferential wall 42 and the piston body 1 are joined together by metal flow. The combustion chamber structure 3 that forms the circumferential wall 42 and the bottom wall 43 is formed of Niresist whose thermal expansion coefficient is close to that of aluminum alloy of the piston body 1. The piston top portion 35 of the combustion chamber structure 3 is made of heat-resistant Incoloy 903 or $Si_3N_4$ ceramics with a low thermal expansion coefficient.

Figure 17:
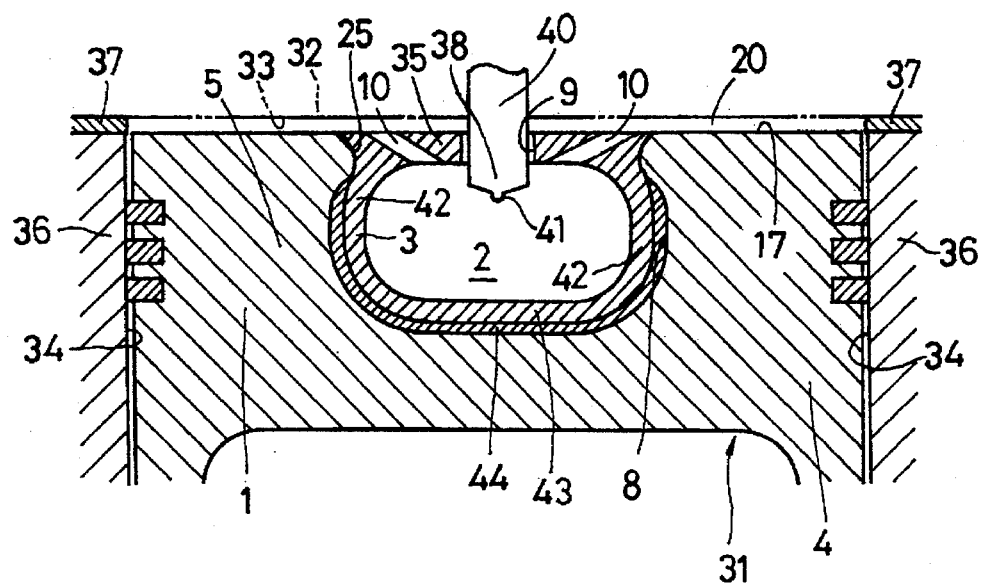
FIG. 17 is a cross section of a piston structure with a combustion chamber as a further embodiment of this invention.
Figure 18:
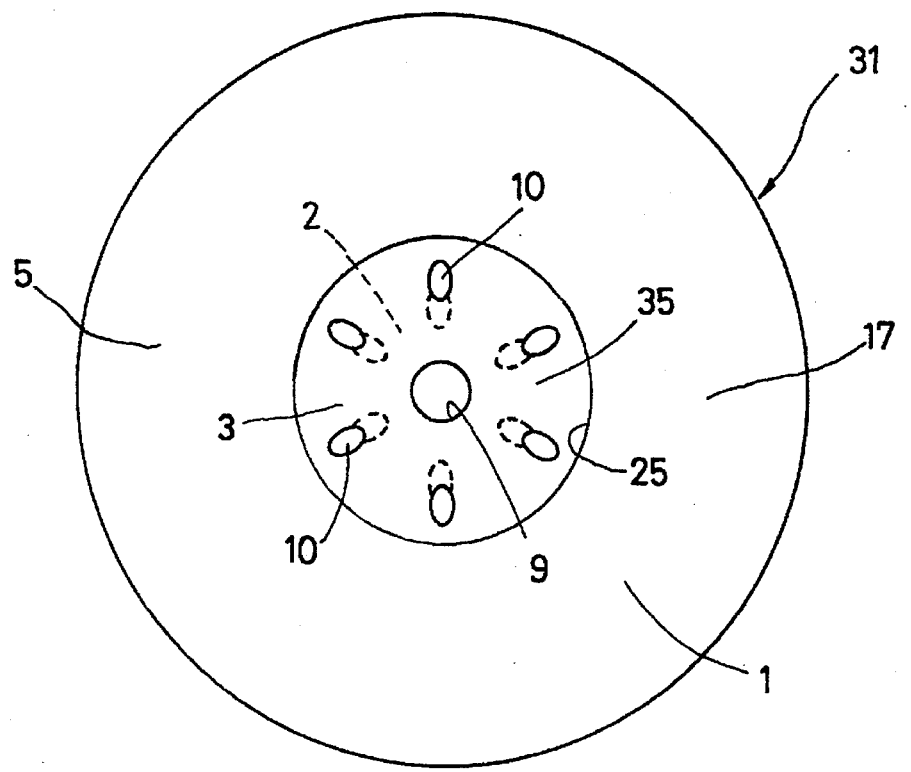
FIG. 18 is a plan view of the piston with a combustion chamber of FIG. 17.

Next, by referring to FIGS. 17 and 18, a further embodiment of the piston structure with a precombustion chamber according to this invention is described. In this embodiment, the combustion chamber structure 3 has the piston top portion 35, the circumferential wall 42 and the bottom wall 43 formed as one piece and is made of a composite material of porous AlN body impregnated or filled with Al alloy. In this embodiment, the piston top portion 35 is so constructed that its temperature is below 450° C. A heat insulating material 44 is installed between the combustion chamber structure 3 and the piston body 1 by flame-spraying a material such as PSZ over the outer surface of the combustion chamber structure 3 and casting the piston body 1.

Figure 19:
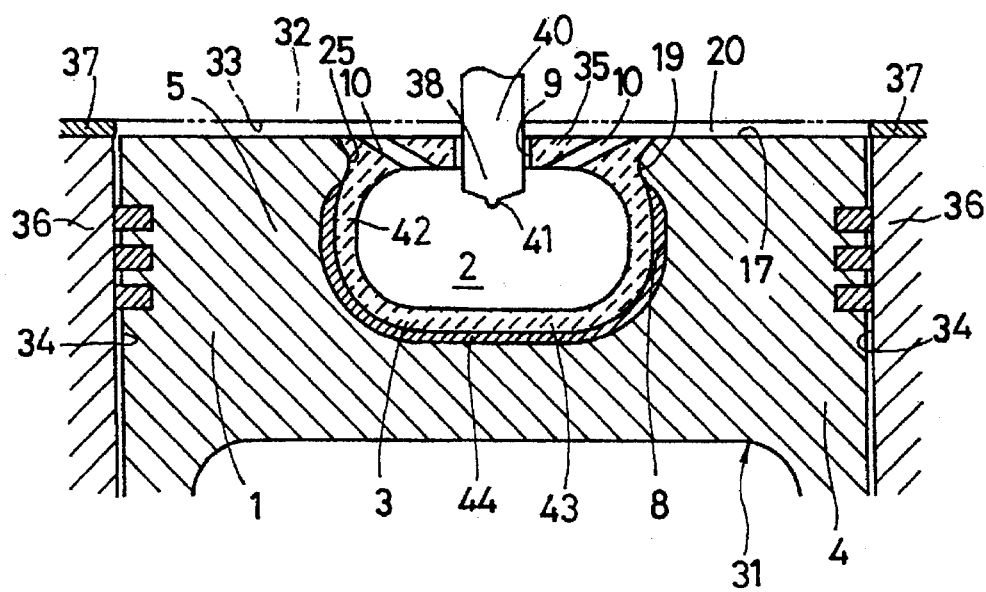
FIG. 19 is a cross section of a piston structure with a combustion chamber as a further embodiment of this invention.
Figure 20:
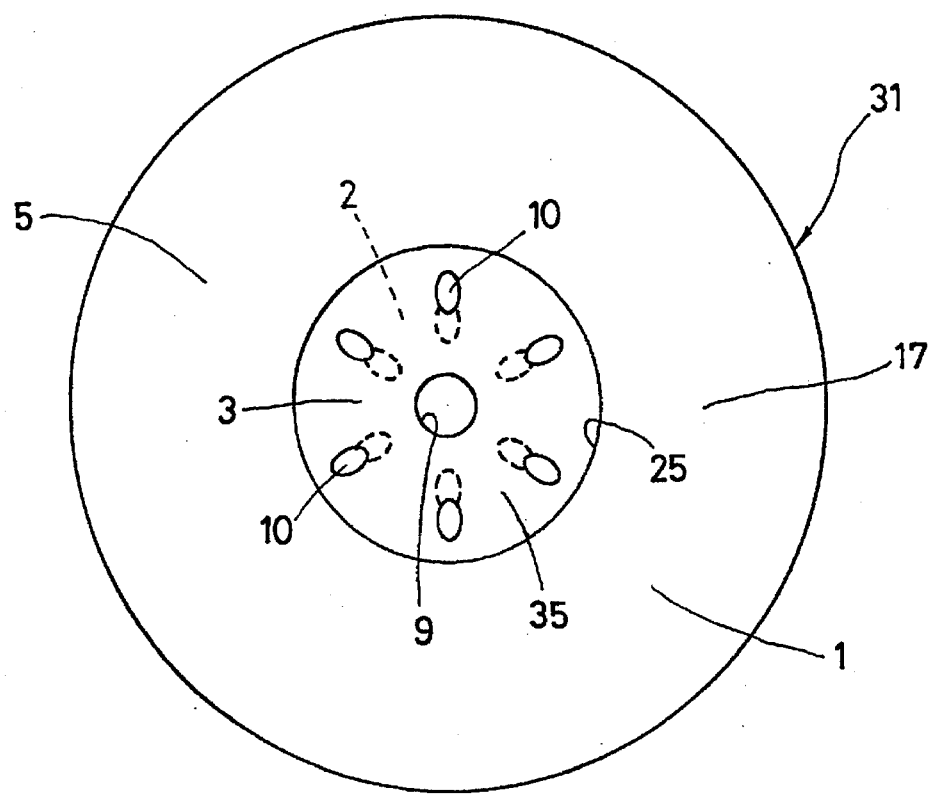
FIG. 20 is a plan view of the piston with a combustion chamber of FIG. 19.

Next, by referring to FIGS. 19 and 20, a further embodiment of the piston structure with a precombustion chamber according to this invention is explained. In this embodiment, the combustion chamber structure 3 forming the circumferential wall 42 and the bottom wall 43 is made of Ti—Si—C fiber-reinforced ceramics [for example, Tyranno whisker-reinforced cordierire ($2MgO.2Al_2O_3.5SiO_2$)] with low thermal expansion coefficient, high strength and high heat insulation capability.

Figure 21:
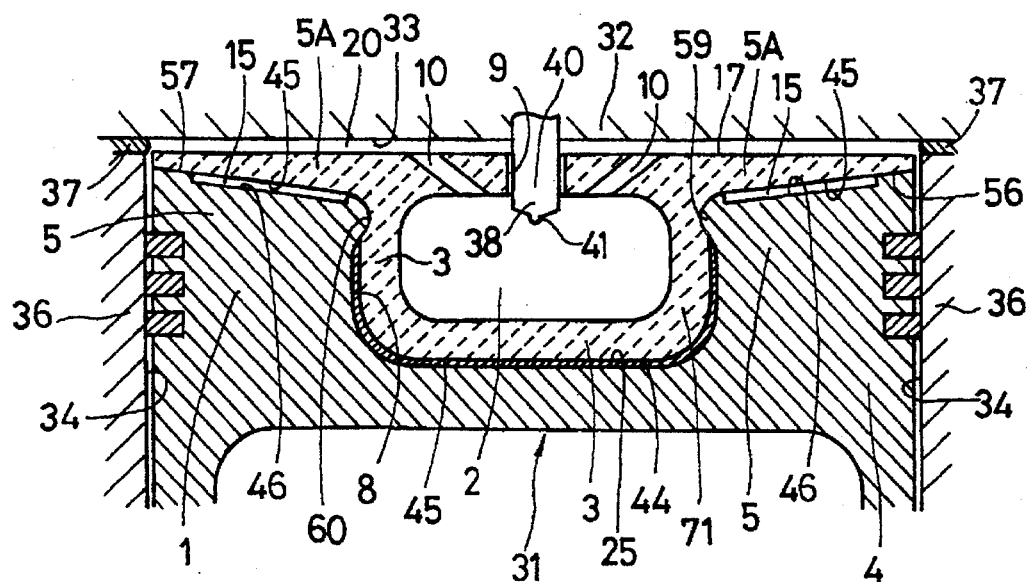
FIG. 21 is a cross section of a piston structure with a combustion chamber as a further embodiment of this invention.
Figure 22:
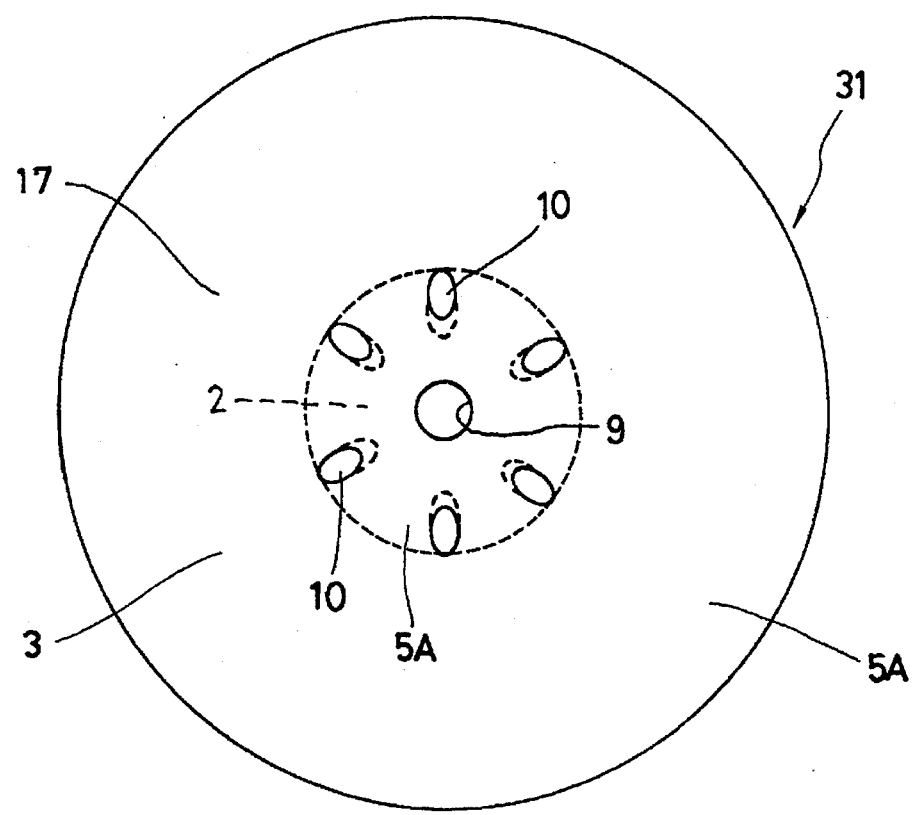
FIG. 22 is a plan view of the piston with a combustion chamber of FIG. 21.

By referring to FIGS. 21 and 22, an embodiment of the piston structure with a combustion chamber according to this invention is explained.

The engine with a precombustion chamber, which has the combustion chamber-incorporated piston structure, comprises: a cylinder block 36 made of such metal material as cast iron and aluminum alloy and forming cylinders 34; and a cylinder head 32 made of such metal material as aluminum alloy and fixed to the cylinder block 36 through a gasket 37. The cylinder block 36 is formed with the same number of bores that corresponds to that of the engine cylinders, and the bores may be fitted with a cylinder liner that forms the cylinder 34. The cylinder head 32 is formed with the same number of intake and exhaust ports (not shown) as that of the cylinders 34, and the intake and exhaust ports are provided with intake and exhaust valves (not shown). The cylinders 34 formed in the cylinder block 36 each accommodate a piston 31 that reciprocates in the cylinder. The main combustion chamber 20 is formed in the cylinder 34 between the bottom surface 33 of the cylinder head and the piston top surface 17. The piston 31 comprises the piston body 1 and the combustion chamber structure 3 having a piston head portion 5A, with the combustion chamber 2 formed in the combustion chamber structure 3.

This engine with a precombustion chamber is a diesel engine that injects a liquid fuel from a fuel injection nozzle 40 into the combustion chamber 2 for burning and which is characterized by the structure of the piston 31 that reciprocates in the cylinder 34. The piston body 1 comprises a piston head portion 5 and a piston skirt portion 4. The combustion chamber structure 3 is formed of a composite material consisting of heat-resistant silicon nitride, silicon carbide or ceramic whisker and metal, or of Inconel 903 or Ni—Cr-based heat-resistant metal. The piston body 1 is made of a metal material such as aluminum alloy and cast iron. The combustion chamber structure 3 has a combustion chamber 2 located almost at the center of the cylinder 34, a nozzle insertion hole 9 at the center of the combustion chamber 2, and a plurality of communication holes 10 (in FIG. 2, six) spaced from each other in the circumferential direction of the nozzle insertion hole 9. The communication holes 10 are formed inclined toward the cylinder periphery and arranged along the circumferential direction of the nozzle insertion hole 9.

The cylinder head 32 is secured with the fuel injection nozzle 40, which is located at the center of the cylinder shaft and has an injection opening 41, with an injection opening portion 38 of the fuel injection nozzle 40 protruding from the cylinder head bottom surface 33. As the piston nears the top dead center, the injection opening portion 38 of the fuel injection nozzle 40 passes through the nozzle insertion hole 9 into the combustion chamber 2 where it ejects a fuel from the injection opening 41. Though not shown, a glow plug as an auxiliary device for starting may be installed on the cylinder head 32 and a plug insertion hole formed in the piston head portion 5A so that the glow plug can enter into the combustion chamber 2 when the piston is near the top dead center.

In this embodiment, the combustion chamber structure 3 made of heat-resistant material that forms the whole region of the piston top surface 17 is fixed to the piston body 1, which is made of a metal material, by casting. The bottom surface 45 of the piston head portion 5A of the combustion chamber structure 3 is formed as a taper surface that inclines slightly to the piston top surface 17 side toward the periphery. The top surface 46 of the piston body 1 is formed as a taper surface that extends along the tapered bottom surface 45. An air layer or heat insulating layer 15 is formed between the bottom surface 45 of the piston head portion 5A of the combustion chamber structure 3 and the top surface 46 of the piston head portion 5 of the piston body 1, with the outer circumferential bottom surface 56 of the piston head portion 5A and the outer circumferential top surface 57 of the piston head portion 5 of the piston body 1 in firm contact. Because the peripheral portion of the piston head portion 5A is made thin by the tapered surface, it is deflected slightly to the piston top surface 17 side or upwardly during casting. When the molten metal of the piston body 1 solidifies, it contracts applying the axial contracting force to the piston head portion 5A. This causes the outer circumferential bottom surface 56 of the piston head portion 5A and the outer circumferential top surface 57 of the piston body 1 to come into firm contact with each other, providing a good seal at the outer circumferential boundary between them. This means that, without installing a sealing member between the outer circumferential bottom surface 56 of the piston head portion 5A and the outer circumferential top surface 57 of the piston body 1, a good sealing effect can be produced between the opposing surfaces. If the upper part of the wall body 71 of the piston head portion 5A that forms the combustion chamber 2 is provided with a recess 60 at the base of the taper surface, the piston body 1 is formed with a bulge 59 by casting that corresponds to the recess 60, thus firmly fastening the combustion chamber structure 3 to the piston body 1.

The heat insulating layer is a space that may be formed by installing a combustible material between the bottom surface 45 of the combustion chamber structure 3 and the top surface 46 of the piston body 1 and burning the combustible material during casting. The heat insulating layer is an air layer 15 of a 0.1–0.2 mm gap. If some burning gas flows into the air layer 15, the heat conductivity does not become so high unless the hot burning gas blows through at high speeds. Therefore, the heat flow from this air layer will not increase. Though not shown, a gasket may be interposed between the outer circumferential bottom surface 56 of the piston head portion 5A and the outer circumferential top surface 57 of the piston body 1. In that case, because the bottom surface 45 of the piston head portion 5A of the combustion chamber structure 3 is formed as a taper surface, the gasket is given a compression stress by the contraction of the piston head portion 5 of the piston body 1, improving the sealing performance.

A heat insulating material 44 of porous ceramics is interposed between the wall body 71 of the combustion chamber structure 3 forming the combustion chamber 2 and the cavity 8 formed almost at the center of the piston head portion 5. The heat insulating material 44 such as porous ceramics is applied to the outer surface of the wall body 71 of the piston head portion 5A, and the gasket is fitted to the outer surface of the wall body 71 of the combustion chamber structure 3. In this condition, the piston body 1 is cast to place the heat insulating material 44 and the gasket between the wall body 71 and the cavity 8. When the combustion chamber structure 3 is made of $Si_3N_4$, the heat insulating material 44 can be installed in place by sticking a ceramic fiber forming the heat insulating material 44 to the outer surface of the combustion chamber structure 3. It can also be installed by spraying beforehand a partly stabilized zirconia, which forms the heat insulating material 44, over the outer surface of the cylinder head bottom surface 33.

The communication holes 10 are formed around the nozzle insertion hole 9 in large numbers, and the passage area of the communication holes 10 is distributed around the entire circumference to cover a large area so that the flame and air-fuel mixture ejected from the communication holes 10 can thoroughly mix with the air in the main combustion chamber 20. That is, the communication holes 10 connecting the combustion chamber 2 to the main combustion chamber 20 can be made large in the total passage area, reducing the throttling loss and thereby eliminating reduction in the output. Further, because the combustion chamber 2 is arranged concentric with the center axis of the cylinder and the communication holes 10 are formed at the outer circumferential surface of the combustion chamber 2, even if the increased passage area of the communication holes 10 reduces the ejection energy and the distance the jet flow out of the combustion chamber 2 travels is reduced, the jet flow can mix well with the air in the main combustion chamber 20 in a short period of time. This reduces the burning period in the main combustion chamber 20 and limits the production of HC and smoke.

Figure 23:
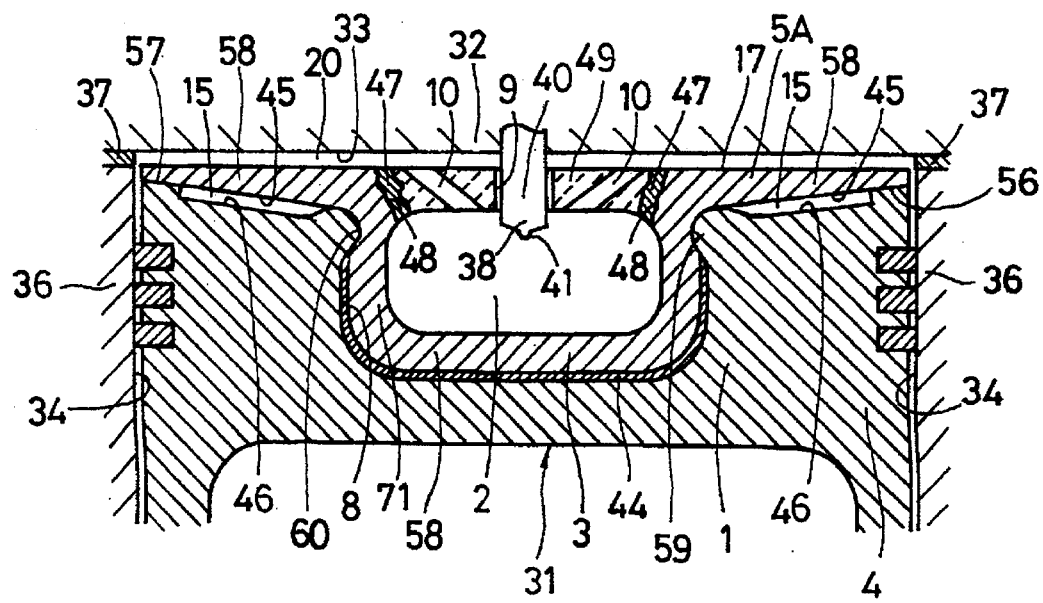
FIG. 23 is a cross section of a piston structure with a combustion chamber as a further embodiment of this invention.
Figure 24:
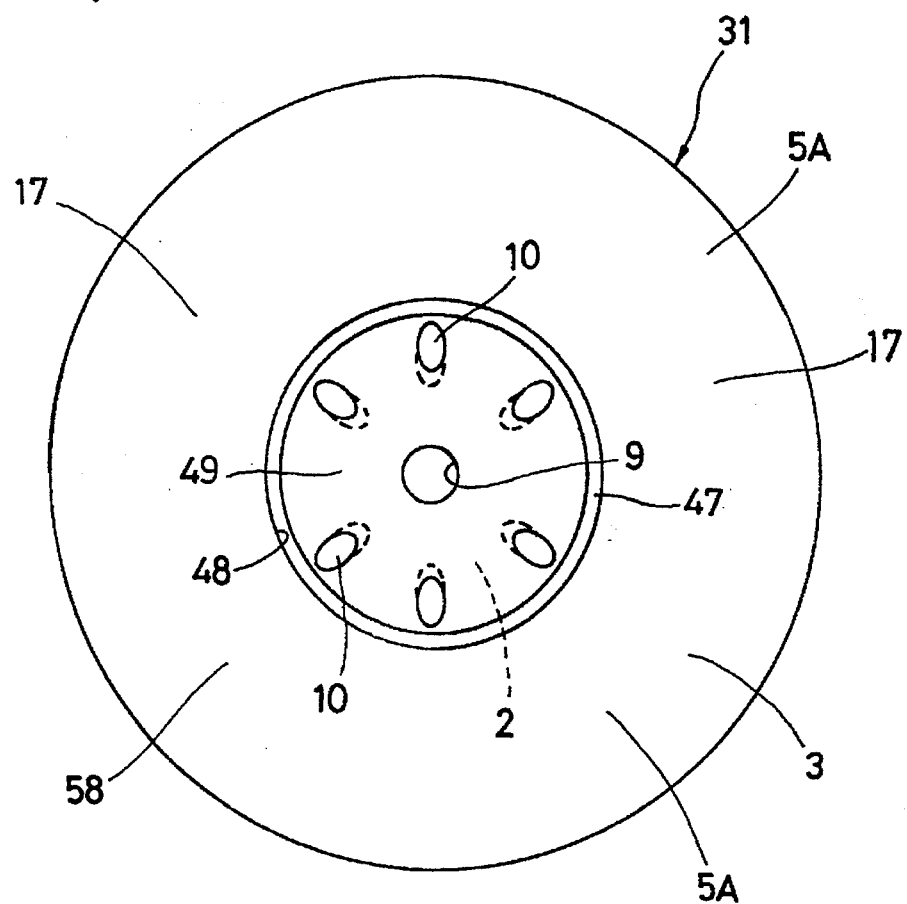
FIG. 24 is a plan view of the piston with a combustion chamber of FIG. 23.

Next, with reference to FIGS. 23 and 24, a further embodiment of the piston structure with a combustion chamber according to this invention is described. In this embodiment, the combustion chamber structure 3 comprises: a piston head body 58 made of heat-resistant metal; and a plate 49 made of heat-resistant ceramics fitted in a center hole 48 of the piston head body 58 by plastic deformation, i.e., metal flow of a joining metal 47. The plate 49 is formed with a nozzle insertion hole 9 and communication holes 10. The plate 49 is made, for example, from a heat-resistant $Si_3N_4$ ceramics with a low thermal expansion coefficient. Because the piston head body 58 is formed of a heat-resistant metal, the material cost of the combustion chamber structure 3 can be reduced. Further, because the plate 49 surrounding the communication holes 10 is made of $Si_3N_4$ with a low thermal expansion coefficient, even when the area near the communication holes 10 becomes hot, the thermal expansion of the combustion chamber structure 3 as a whole is properly balanced, improving the resistance of the structure 3 against deformation.

Figure 25:
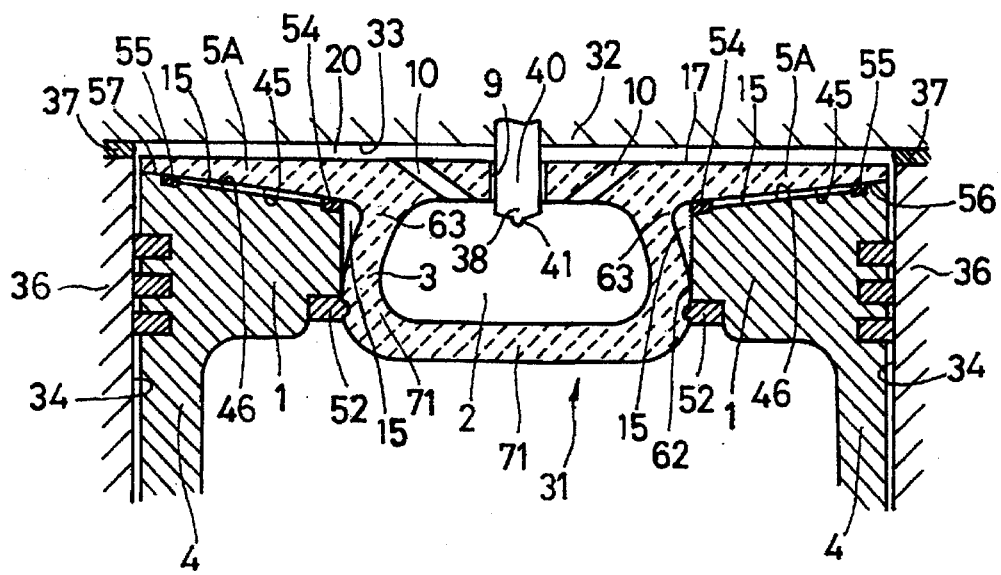
FIG. 25 is a cross section of a piston structure with a combustion chamber as a further embodiment of this invention.
Figure 26:
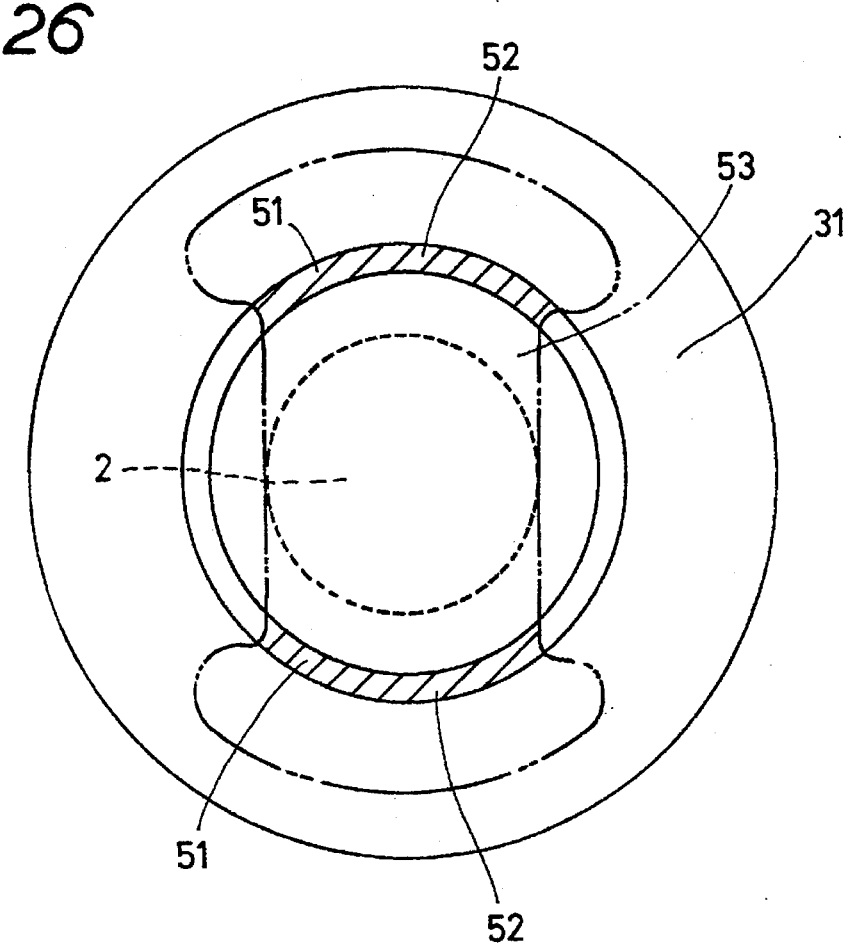
FIG. 26 is a plan view of the piston with a combustion chamber of FIG. 25.

Next, by referring to FIGS. 25 and 26, a further embodiment of the piston structure with a combustion chamber according to this invention is explained. The piston head portion 5A has a side wall outer circumferential portion as a mounting portion to be mounted on the piston skirt portion 4, i.e., a mounting portion formed by a wall body 71 of the precombustion chamber 2. The piston skirt portion 4 is formed with a mounting hole 62 that receives the mounting portion of the piston skirt portion 4. To fix the piston head portion 5A to the piston skirt portion 4, a metal joining member 52 is installed plastically deformed between and extending into the wall body 71 of the mounting portion and the mounting hole 62. Rather than providing the metal joining member 52 over the entire circumference of the piston head portion 5A, it is preferred in terms of strength that the metal joining member 52 be divided, as shown in FIG. 26, into two or more (in this case two) joining pieces 51, which are installed at a piston pin boss 53 that forms a piston pin hole. A heat insulating air layer 15 is formed between the piston head portion 5A of the combustion chamber structure 3 and the piston body 1. Gaskets 54, 55 are interposed between the bottom surface 45 of the piston head portion 5A and the top surface 46 of the piston body 1. The gasket 54 is installed near the mounting hole 62 of the piston body 1 to provide a reliable seal. The gasket 54, which seals between the piston body 1 and the piston head portion 5A, alleviates stresses in the upper part 63 of the wall body 71 of the combustion chamber structure 3 forming the combustion chamber 2. The gasket 55 is installed on the outer periphery side of the piston head portion 5A to provide a small level of gas sealing function.

Figure 27:
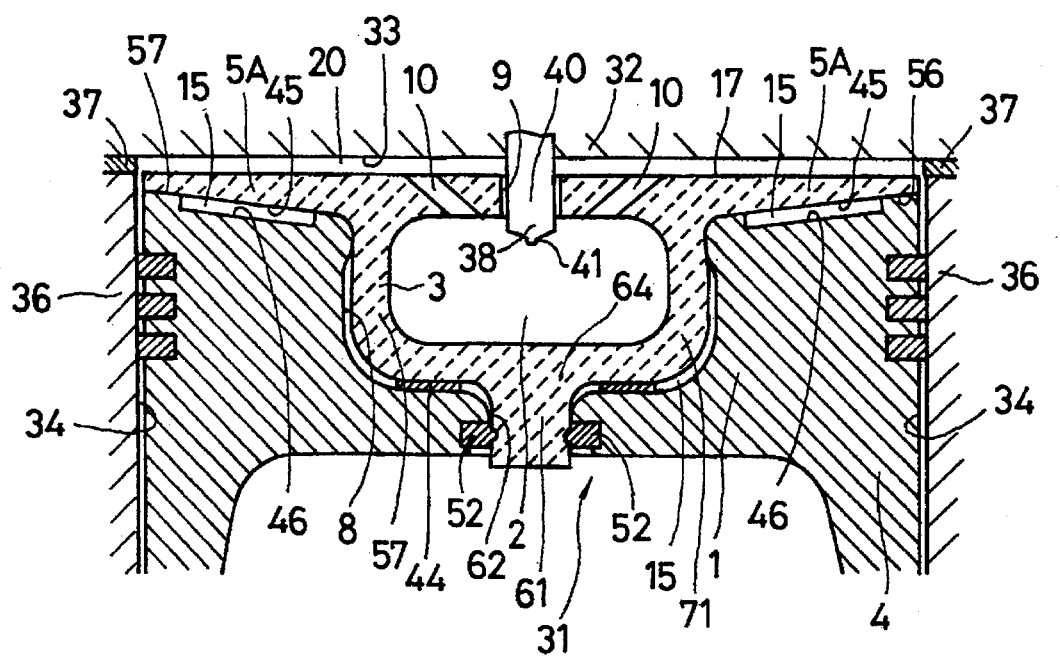
FIG. 27 is a cross section of a piston structure with a combustion chamber as a further embodiment of this invention.

Next, with reference to FIG. 27, a further embodiment of the piston structure with a combustion chamber according to this invention is explained. The mounting portion of the combustion chamber structure 3 to be mounted on the piston body 1 is formed as a mounting shaft 61 that projects from a bottom wall portion 64 which forms the combustion chamber 2. To fix the combustion chamber structure 3 to the piston body 1, the metal joining member 52 is installed plastically deformed between and extending into the mounting shaft 61 and the mounting hole 62. The joining member 52 is formed of a connecting ring that extends over the entire outer circumference of the mounting shaft 61 of the combustion chamber structure 3.

Figure 28:
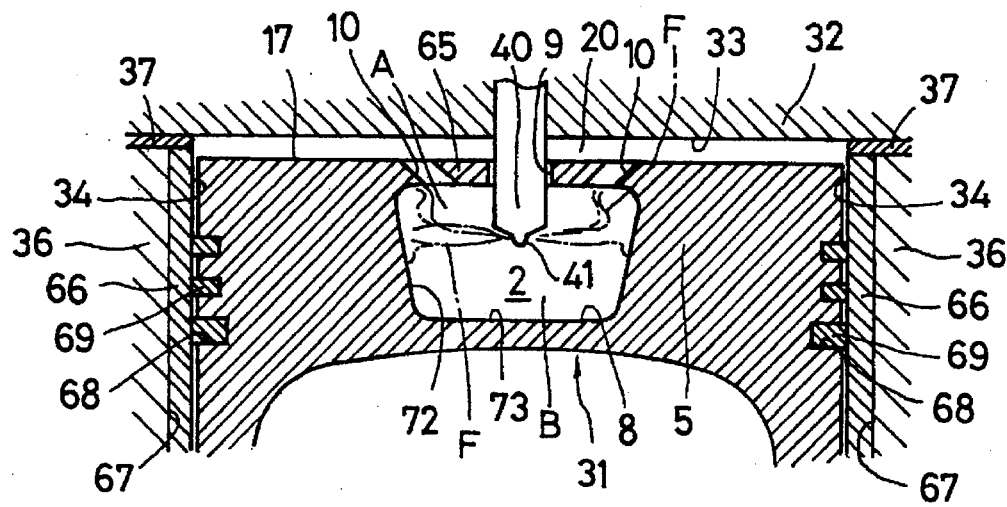
FIG. 28 is a cross section of a piston structure with a combustion chamber as a further embodiment of this invention.
Figure 29:
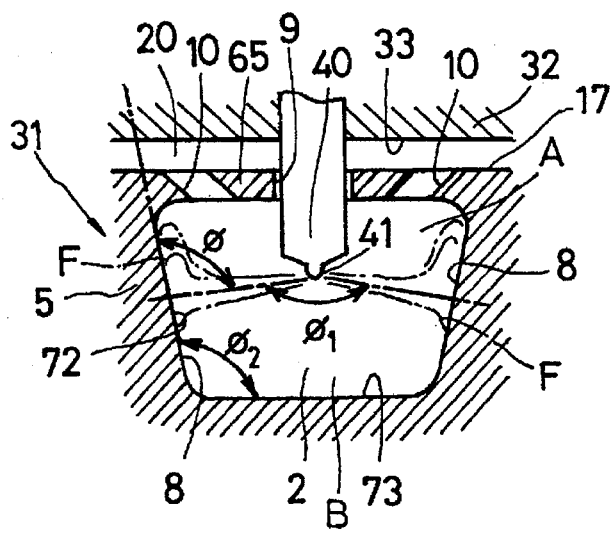
FIG. 29 is an enlarged schematic diagram showing a combustion chamber region in the piston structure of FIG. 28.
Figure 30:
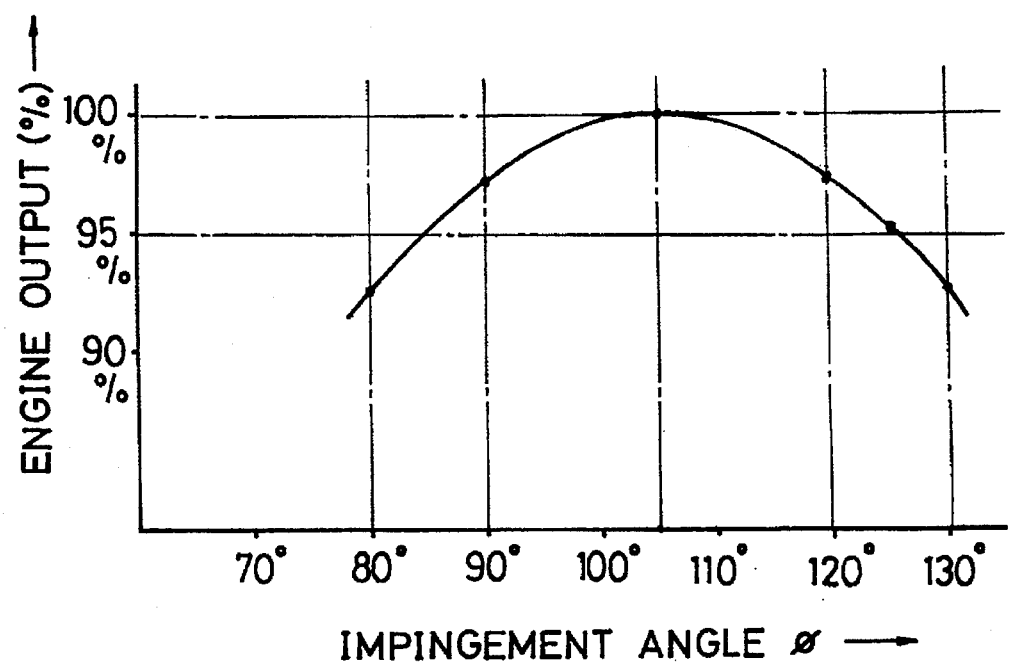
FIG. 30 is a graph showing an engine output with respect to the impingement angle between fuel sprayed from a fuel injection nozzle and a side wall of the combustion chamber.

By referring to FIGS. 28 to 30, a further embodiment of the piston structure with a combustion chamber according to this invention is explained. The engine with a precombustion chamber, which has the combustion chamber-incorporated piston structure, comprises: a cylinder liner 66 installed in a bore portion 67 in the cylinder block 36 to form the cylinder 34; a cylinder head 32 secured to the cylinder block 36 with a gasket 37 therebetween; a fuel injection nozzle 40 mounted to the cylinder head 32; and a piston 31 reciprocating in the cylinder 34. The main combustion chamber 20 is formed in a region in the cylinder 34 enclosed by the cylinder head bottom surface 33 and the piston top surface 17. The precombustion chamber, i.e., the combustion chamber 2, is formed in the cavity 8 in the piston 31. Though not shown, the cylinder head 32 is provided with a glow plug as an auxiliary device for starting. The cylinder block 36 is formed with the same number of bore portions 67 as that of engine cylinders. The cylinder 34 may be formed by the cylinder liner 66 installed in the bore portion 67 or directly by the bore portion 67 in the cylinder block 36. Though not shown, the cylinder head 32 is formed with intake and exhaust ports, which in turn are provided with intake and exhaust valves. The intake and exhaust ports may be provided in a lower part of the cylinder to make the engine a two-stroke construction.

The piston 31 may also be constructed of: a piston skirt made of such metals as aluminum alloy and FC; a piston head portion 5 made of a high-strength ceramics such as $Si_3N_4$ secured to the piston skirt; and a combustion chamber structure which is made of a heat-resistant ceramics such as $Si_3N_4$ and fitted in the cavity 8 in the piston head portion 5 and which forms the combustion chamber 2. A heat insulating structure for the combustion chamber 2 can be formed, for example, by installing a ceramics combustion chamber structure in the cavity 8 of the piston 31 and forming a heat insulating air layer between the cavity 8 and the outer surface of the combustion chamber structure. The piston 31 is formed with a piston ring groove 68 in which to install a piston ring 69.

In this embodiment, the piston 31, which reciprocates in the cylinder 34, is formed with a cavity 8 at the cylinder center, which is covered with a piston top portion 65 to form a combustion chamber 2. In the figure, the combustion chamber 2 is shaped like an inverted truncated cone. The side wall surface 72 of the combustion chamber 2 is formed as an inclined surface that expands toward the communication holes 10. The bottom surface 73 of the combustion chamber 2 extends parallel to the piston top surface 17. In other words, the interior of the combustion chamber 2 is formed to progressively expand upwardly so that the upper part A of the combustion chamber is greater in volume than the lower part B. The piston top portion 65 is formed with a nozzle insertion hole 9 through which a fuel injection nozzle 40 provided at the center of the cylinder 34 can protrude, and with a plug hole through which a glow plug can pass. Therefore, the fuel injection nozzle 40 and the glow plug can enter through the nozzle insertion hole 9 and the plug hole, respectively, into the combustion chamber 2 when the piston nears the top dead center. In this engine with a precombustion chamber, the volume of the combustion chamber 2 located at the center of the cylinder is set at 35–65% of the total volume of the combustion chamber when the piston is at the top dead center or the compression end, the total volume being the sum of the volumes of the main combustion chamber 20 and the combustion chamber 2.

The fuel injection nozzle 40 has multiple injection holes 41 which, when the piston is near the top dead center, enter into the combustion chamber 2 and spray fuel toward the upper half, in the axial height direction, of the side wall surface 72 of the combustion chamber 2. The piston top portion 65 is formed with communication holes 10 that are spaced from each other and arranged along the nozzle insertion hole 9 to communicate the main combustion chamber 20 and the combustion chamber 2. The communication holes 10 are formed in the piston top portion 65 and inclined from the combustion chamber 2 toward the periphery of the cylinder 34 of the main combustion chamber 20 so that flame and unburned air-fuel mixture ejected from the communication holes 10 will spread toward the periphery of the cylinder. The passage area of the communication holes 10 is 1.5–5% of the total area of the piston top surface 17. The number of multiple injection holes 41 in the fuel injection nozzle 40 may be set equal to that of the communication holes 10 formed in the piston top portion 65. In that case, there is a one-to-one correspondence between the communication holes 10 and the multiple injection holes 41, assuring a proper ejection of the fuel mixture produced near the communication holes 10.

The engine with a precombustion chamber is characterized in that, as shown in FIG. 29, the impinging angle $\phi$ on the piston top portion 65 side of the fuel sprayed from the multiple injection holes 41 against the side wall surface 72 is set in the range of between 90° and 120°. FIG. 30 shows the result of measurements of the engine output ratio (%) for a range of impinging angle $\phi$ of the sprayed fuel F with respect to the side wall surface 72. Tests conducted for a variety of the impinging angle $\phi$ involve spraying the fuel from the multiple injection holes 41 of the fuel injection nozzle 40 against the upper half, in the axial height direction, of the side wall surface 72 of the combustion chamber 2, changing the spray angle $\phi 1$ on the communication holes 10 side of the sprayed fuel in the range of 160° to 210°, and changing the wall surface angle $\phi 2$ between the side wall surface 72 and the bottom surface 73 of the combustion chamber 2 in the range of 90° to 140°.

The evaluation graph of FIG. 30 indicates that the engine output reaches the maximum 100% when the impinging angle is 105° and that as the impinging angle increases or decreases from 105°, the engine output gradually lowers. Hence, from the graph it is found desirable in terms of increasing the engine output that the impinging angle $\phi$ between the fuel spray direction and the side wall surface 72 of the combustion chamber 2 be set at the maximum-output angle of 105° plus or minus 15°, that is, in the range of 90° to 120°.

By setting the sprayed fuel impinging angle $\phi$ with respect to the side wall surface 72 in the 90°–140° range, the sprayed fuel that has impinged against the side wall surface 72 spreads along the surface 72 toward the communication holes 10 in the piston top portion 65, thus forming the air-fuel mixture near the communication holes 10. Because the fuel mixture is drawn toward the communication holes 10, the air-fuel mixture generated is rich near the communication holes 10 in the upper part A of the combustion chamber and lean near the bottom in the lower part B. In this way, the fuel concentration of the mixture can be differentiated between the upper part A and the lower part B of the combustion chamber 2.

Therefore, after the sprayed fuel is ignited at around the center of the combustion chamber 2, the mixture present close to the communication holes 10 is ejected unburned from the lower part B of the combustion chamber through the communication holes 10 into the main combustion chamber 20 in one blow, thus reducing the burning period in the main combustion chamber 20. Furthermore, because the mixture ejected from the combustion chamber 2 into the main combustion chamber 20 is unburned, the similar effect to that of the EGR (exhaust gas recirculation) can be assured, limiting the production of emissions such as NOx, HC and smoke.

Because two or more communication holes 10 connecting the combustion chamber 2 to the main combustion chamber 20 are arranged in a circumferential direction of the combustion chamber 2, the passage area of the communication holes 10 can be made large as a whole, which in turn reduces the throttling loss. Further, because the combustion chamber 2 is formed at the center of the piston, i.e., at the center of the cylinder, the distance that the flame and unburned mixture gas—ejected from the periphery of the combustion chamber 2 through the communication holes 10 into the main combustion chamber 20—travels to reach the cylinder wall surface with respect to fresh air around the entire circumference of the cylinder 34, that is, in the main combustion chamber 20 is reduced. This in turn improves the utilization of the air present in the main combustion chamber 20, promoting the mixing of fuel gas and air, increasing the burning speed. As a result, the production of emissions such as NOx, HC and smoke can be limited during combustion.

What is claimed is:

1. A piston structure comprising:
   a piston body made of a metal material and having a cavity formed at the center of a piston head portion;
   a combustion chamber structure made of a heat-resistant, high-temperature high-strength material installed in the cavity, the combustion chamber structure including a combustion chamber formed almost at the center of the piston head portion, a nozzle insertion hole formed almost at the center of the combustion chamber, and communication holes spaced from each other and arranged around the nozzle insertion hole;
   heat insulating air layers formed between a wall surface of the cavity in the piston body and the combustion chamber structure; and
   a mounting ring made of almost the same kind of material as that of the piston body and joined with the piston body, the mounting ring engaging the outer circumference of the combustion chamber structure installed in the cavity to fix the combustion chamber structure inside the cavity;
   wherein a gap is formed between an inner circumferential surface of the mounting ring and an outer circumferential surface of the combustion chamber structure.

2. A piston structure with a combustion chamber, according to claim 1, wherein thermal expansion control members are installed between a top surface of a projecting portion provided at a lower outer periphery of the combustion chamber structure and a lower end surface of the mounting ring.

3. A piston structure with a combustion chamber, according to claim 1, wherein an upper outer circumferential surface of the mounting ring and the cavity wall surface of the piston body are fused together, and a gap is formed between a lower outer circumferential surface of the mounting ring and the cavity wall surface of the piston body.

4. A piston structure with a combustion chamber, according to claim 1, wherein gaskets for sealing are interposed between undercut portions formed on the inner circumferential surface of the mounting ring and stepped portions formed on the outer circumferential surface of the combustion chamber structure.

5. A piston structure comprising:

a piston body made of a metal material and having a cavity formed at the center of a piston head portion;

a combustion chamber structure made of a heat-resistant, high-temperature high-strength material installed in the cavity, the combustion chamber structure including a combustion chamber formed almost at the center of the piston head portion, a nozzle insertion hole formed almost at the center of the combustion chamber, and communication holes spaced from each other and arranged around the nozzle insertion hole;

heat insulating air layers formed between a wall surface of the cavity in the piston body and the combustion chamber structure; and a mounting ring made of almost the same kind of material as that of the piston body and joined with the piston body, the mounting ring engaging the outer circumference of the combustion chamber structure installed in the cavity to fix the combustion chamber structure inside the cavity;

wherein an upper outer circumferential surface of the mounting ring and the cavity wall surface of the piston body are fused together, and a gap is formed between a lower outer circumferential surface of the mounting ring and the cavity wall surface of the piston body.

6. The piston structure according to claim 5, wherein thermal expansion control members are installed between a top surface of a projecting portion provided at a lower outer periphery of the combustion chamber structure and a lower end surface of the mounting ring.

7. A piston structure comprising:

a piston body made of a metal material and having a cavity formed at the center of a piston head portion;

a combustion chamber structure made of a heat-resistant, high-temperature high-strength material installed in the cavity, the combustion chamber structure including a combustion chamber formed almost at the center of the piston head portion, a nozzle insertion hole formed almost at the center of the combustion chamber, and communication holes spaced from each other and arranged around the nozzle insertion hole;

heat insulating air layers formed between a wall surface of the cavity in the piston body and the combustion chamber structure; and a mounting ring made of almost the same kind of material as that of the piston body and joined with the piston body, the mounting ring engaging the outer circumference of the combustion chamber structure installed in the cavity to fix the combustion chamber structure inside the cavity;

wherein gaskets for sealing are interposed between undercut portions formed on the inner circumferential surface of the mounting ring and stepped portions formed on the outer circumferential surface of the combustion chamber structure.

8. The piston structure according to claim 7, wherein thermal expansion control members are installed between a top surface of a projecting portion provided at a lower outer periphery of the combustion chamber structure and a lower end surface of the mounting ring.

* * * * *